(12) United States Patent
Morris et al.

(10) Patent No.: US 12,149,153 B2
(45) Date of Patent: *Nov. 19, 2024

(54) MOBILE ELECTRIC POWER GENERATION FOR HYDRAULIC FRACTURING OF SUBSURFACE GEOLOGICAL FORMATIONS

(71) Applicant: Typhon Technology Solutions (U.S.), LLC, The Woodlands, TX (US)

(72) Inventors: Jeffrey G. Morris, The Woodlands, TX (US); Adrian Benjamin Bodishbaugh, The Woodlands, TX (US); Brett Vann, The Woodlands, TX (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,760

(22) Filed: Sep. 26, 2023

(65) Prior Publication Data

US 2024/0030782 A1    Jan. 25, 2024

Related U.S. Application Data

(63) Continuation of application No. 17/379,715, filed on Jul. 19, 2021, now Pat. No. 11,799,356, which is a
(Continued)

(51) Int. Cl.
*H02K 7/18* (2006.01)
*E21B 41/00* (2006.01)
(Continued)

(52) U.S. Cl.
CPC .......... *H02K 7/1823* (2013.01); *E21B 41/00* (2013.01); *E21B 41/0085* (2013.01);
(Continued)

(58) Field of Classification Search
CPC .. F01D 25/28; F01D 25/30; F02C 7/20; F02C 7/052; F02C 7/055; E21B 41/00; E21B 41/0085; H02K 7/1823
See application file for complete search history.

(56) References Cited

U.S. PATENT DOCUMENTS

| 3,791,682 A | 2/1974 | Mitchell |
| 3,837,179 A | 9/1974 | Barth |

(Continued)

FOREIGN PATENT DOCUMENTS

| AR | 087298 A1 | 3/2014 |
| AR | 092923 A1 | 5/2015 |

(Continued)

OTHER PUBLICATIONS

APR Energy. "TM2500 GEN8 Mobile Gas Turbine." APR Energy Product Profile, Oct. 2017, 2 pages.
(Continued)

*Primary Examiner* — Scott J Walthour
(74) *Attorney, Agent, or Firm* — Fenwick & West LLP

(57) ABSTRACT

Providing mobile electric power comprising a power generation transport configured to convert hydrocarbon fuel to electricity and an inlet and exhaust transport configured to: couple to at least one side of the power generation transport such that the inlet and exhaust transport is not connected to
(Continued)

a top side of the power generation transport, provide ventilation air and combustion air to the power generation transport, collect exhaust air from the power generation transport, and filter the exhaust air.

16 Claims, 13 Drawing Sheets

Related U.S. Application Data continuation of application No. 16/531,913, filed on Aug. 5, 2019, now Pat. No. 11,070,109, which is a continuation of application No. 15/385,582, filed on Dec. 20, 2016, now Pat. No. 10,374,485, which is a continuation of application No. 14/971,555, filed on Dec. 16, 2015, now Pat. No. 9,562,420.

(60) Provisional application No. 62/094,773, filed on Dec. 19, 2014.

(51) Int. Cl.
| | |
|---|---|
| E21B 43/26 | (2006.01) |
| F01D 15/00 | (2006.01) |
| F01D 15/10 | (2006.01) |
| F01D 25/28 | (2006.01) |
| F01D 25/30 | (2006.01) |
| F02C 3/04 | (2006.01) |
| F02C 6/00 | (2006.01) |
| F02C 7/052 | (2006.01) |
| F02C 7/055 | (2006.01) |
| F02C 7/20 | (2006.01) |
| F02C 7/32 | (2006.01) |
| E21B 43/16 | (2006.01) |

(52) U.S. Cl.
CPC .............. *E21B 43/26* (2013.01); *F01D 15/00* (2013.01); *F01D 15/10* (2013.01); *F01D 25/28* (2013.01); *F01D 25/30* (2013.01); *F02C 3/04* (2013.01); *F02C 6/00* (2013.01); *F02C 7/052* (2013.01); *F02C 7/055* (2013.01); *F02C 7/20* (2013.01); *F02C 7/32* (2013.01); *E21B 43/16* (2013.01); *E21B 43/2607* (2020.05); *F05D 2220/32* (2013.01); *F05D 2220/76* (2013.01); *F05D 2240/35* (2013.01)

(56) References Cited

U.S. PATENT DOCUMENTS

| | | |
|---|---|---|
| 4,100,822 A | 7/1978 | Rosman |
| 4,159,180 A | 6/1979 | Cooper et al. |
| 4,272,224 A | 6/1981 | Kabele |
| 4,311,395 A | 1/1982 | Douthitt et al. |
| 4,341,508 A | 7/1982 | Rambin |
| 6,007,227 A | 12/1999 | Carlson |
| 6,142,878 A | 11/2000 | Barin |
| 6,334,746 B1 | 1/2002 | Nguyen et al. |
| 6,398,521 B1 | 6/2002 | Yorulmazoglu |
| 6,765,304 B2 | 7/2004 | Baten et al. |
| 6,773,238 B1 | 8/2004 | Sprakel |
| 6,786,051 B2 | 9/2004 | Kristich et al. |
| 6,907,737 B2 | 6/2005 | Mittricker et al. |
| 7,114,322 B2 | 10/2006 | Yamanaka et al. |
| 7,581,379 B2 | 9/2009 | Yoshida et al. |
| 7,608,935 B2 | 10/2009 | Scherzer |
| 7,683,499 B2 | 3/2010 | Saucier |
| 7,819,209 B1 | 10/2010 | Bezner |
| 7,921,914 B2 | 4/2011 | Bruins et al. |
| 8,083,504 B2 | 12/2011 | Williams et al. |
| 8,587,136 B2 | 11/2013 | Williams |
| 8,789,601 B2 | 7/2014 | Broussard et al. |
| 8,997,904 B2 | 4/2015 | Cryer et al. |
| 9,091,215 B2 | 7/2015 | Baten et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,395,049 B2 | 7/2016 | Vicknair et al. |
| 9,475,020 B2 | 10/2016 | Coli et al. |
| 9,475,021 B2 | 10/2016 | Coli et al. |
| 9,534,473 B2 | 1/2017 | Morris et al. |
| 9,945,365 B2 | 4/2018 | Hernandez et al. |
| 10,107,084 B2 | 10/2018 | Coli et al. |
| 10,107,085 B2 | 10/2018 | Coli et al. |
| 10,118,194 B2 | 11/2018 | Kobayashi et al. |
| 10,124,353 B1 | 11/2018 | Bottiger et al. |
| 10,184,397 B2 | 1/2019 | Austin et al. |
| 10,221,668 B2 | 3/2019 | Coli et al. |
| 10,227,855 B2 | 3/2019 | Coli et al. |
| 10,374,485 B2 * | 8/2019 | Morris ..................... F02C 7/20 |
| 10,378,326 B2 | 8/2019 | Morris et al. |
| 10,502,042 B2 | 12/2019 | Coli et al. |
| 10,519,730 B2 | 12/2019 | Morris et al. |
| 10,648,312 B2 | 5/2020 | Coli et al. |
| 10,689,961 B2 | 6/2020 | Coli et al. |
| 10,704,472 B2 | 7/2020 | Davis |
| 10,718,194 B2 | 7/2020 | Coli et al. |
| 10,724,353 B2 | 7/2020 | Coli et al. |
| 10,774,630 B2 | 9/2020 | Coli et al. |
| 10,837,270 B2 | 11/2020 | Coli et al. |
| 10,851,634 B2 | 12/2020 | Coli et al. |
| 10,876,386 B2 | 12/2020 | Coli et al. |
| 10,895,138 B2 | 1/2021 | Coli et al. |
| 10,962,305 B2 | 3/2021 | Morris et al. |
| 11,070,109 B2 * | 7/2021 | Morris ..................... F01D 25/28 |
| 11,168,554 B2 | 11/2021 | Morris et al. |
| 2002/0002101 A1 | 1/2002 | Hayashi |
| 2003/0057704 A1 | 3/2003 | Baten et al. |
| 2003/0079479 A1 | 5/2003 | Kristich et al. |
| 2004/0104577 A1 | 6/2004 | Alger et al. |
| 2005/0029476 A1 | 2/2005 | Biester et al. |
| 2006/0080971 A1 | 4/2006 | Smith et al. |
| 2006/0225402 A1 | 10/2006 | Kierspe et al. |
| 2006/0254281 A1 | 11/2006 | Badeer et al. |
| 2006/0260331 A1 | 11/2006 | Andreychuk |
| 2007/0099746 A1 | 5/2007 | Hahlbeck |
| 2007/0132243 A1 | 6/2007 | Wurtele et al. |
| 2008/0044298 A1 | 2/2008 | Laski |
| 2008/0064569 A1 | 3/2008 | Baxter et al. |
| 2008/0264625 A1 | 10/2008 | Ochoa |
| 2008/0267785 A1 | 10/2008 | Cervenka et al. |
| 2009/0068031 A1 | 3/2009 | Gambier et al. |
| 2009/0084558 A1 | 4/2009 | Bloom |
| 2009/0092510 A1 | 4/2009 | Williams et al. |
| 2009/0308602 A1 | 12/2009 | Bruins et al. |
| 2010/0038907 A1 | 2/2010 | Hunt et al. |
| 2010/0071561 A1 | 3/2010 | Marwitz et al. |
| 2010/0132949 A1 | 6/2010 | DeFosse et al. |
| 2011/0088391 A1 | 4/2011 | Sumser et al. |
| 2011/0236225 A1 | 9/2011 | Leugemors et al. |
| 2011/0247334 A1 | 10/2011 | Alexander |
| 2012/0153634 A1 | 6/2012 | Williams |
| 2012/0255734 A1 | 10/2012 | Coli et al. |
| 2013/0045117 A1 | 2/2013 | Wishart |
| 2013/0306322 A1 | 11/2013 | Sanborn et al. |
| 2014/0009697 A1 | 1/2014 | Kuromizu |
| 2014/0096974 A1 | 4/2014 | Coli et al. |
| 2014/0138079 A1 | 5/2014 | Broussard et al. |
| 2014/0158345 A1 | 6/2014 | Jang et al. |
| 2014/0174717 A1 | 6/2014 | Broussard et al. |
| 2014/0219824 A1 | 8/2014 | Burnette |
| 2015/0027712 A1 | 1/2015 | Vicknair et al. |
| 2015/0068724 A1 | 3/2015 | Coli et al. |
| 2015/0068754 A1 | 3/2015 | Coli et al. |
| 2015/0211524 A1 | 7/2015 | Broussard et al. |
| 2015/0252661 A1 | 9/2015 | Glass |
| 2015/0275891 A1 | 10/2015 | Chong |
| 2015/0300145 A1 | 10/2015 | Coli et al. |
| 2015/0300291 A1 | 10/2015 | Yamanaka et al. |
| 2015/0300336 A1 | 10/2015 | Hernandez et al. |
| 2015/0314255 A1 | 11/2015 | Coli et al. |

(56) References Cited

U.S. PATENT DOCUMENTS

| | | |
|---|---|---|
| 2016/0032703 A1 | 2/2016 | Broussard et al. |
| 2016/0075387 A1 | 3/2016 | Fong et al. |
| 2016/0177675 A1 | 6/2016 | Morris et al. |
| 2016/0177678 A1 | 6/2016 | Morris et al. |
| 2016/0208593 A1 | 7/2016 | Coli et al. |
| 2016/0208594 A1 | 7/2016 | Coli et al. |
| 2016/0326854 A1 | 11/2016 | Broussard et al. |
| 2016/0326855 A1 | 11/2016 | Coli et al. |
| 2016/0369609 A1 | 12/2016 | Morris et al. |
| 2017/0016433 A1 | 1/2017 | Chong et al. |
| 2017/0036178 A1 | 2/2017 | Coli et al. |
| 2017/0037718 A1 | 2/2017 | Coli et al. |
| 2017/0104389 A1 | 4/2017 | Morris et al. |
| 2017/0129338 A1 | 5/2017 | Cryer et al. |
| 2017/0259227 A1 | 9/2017 | Morris et al. |
| 2017/0314380 A1 | 11/2017 | Oehring et al. |
| 2018/0041093 A1 | 2/2018 | Miranda |
| 2018/0328279 A1 | 11/2018 | Austin et al. |
| 2018/0363434 A1 | 12/2018 | Coli et al. |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0055827 A1 | 2/2019 | Coli et al. |
| 2019/0112908 A1 | 4/2019 | Coli et al. |
| 2019/0169971 A1 | 6/2019 | Oehring et al. |
| 2019/0211661 A1 | 7/2019 | Reckels et al. |
| 2019/0271218 A1 | 9/2019 | Coli et al. |
| 2019/0277125 A1 | 9/2019 | Coli et al. |
| 2019/0277126 A1 | 9/2019 | Coli et al. |
| 2019/0277127 A1 | 9/2019 | Coli et al. |
| 2019/0277128 A1 | 9/2019 | Coli et al. |
| 2019/0356199 A1 | 11/2019 | Morris et al. |
| 2020/0318467 A1 | 10/2020 | Coli et al. |
| 2020/0347710 A1 | 11/2020 | Coli et al. |
| 2020/0347711 A1 | 11/2020 | Coli et al. |
| 2020/0408144 A1 | 12/2020 | Feng et al. |
| 2021/0025324 A1 | 1/2021 | Morris et al. |
| 2021/0071574 A1 | 3/2021 | Feng et al. |

FOREIGN PATENT DOCUMENTS

| | | |
|---|---|---|
| AR | 104823 A1 | 8/2017 |
| AR | 104824 A1 | 8/2017 |
| AR | 104825 A2 | 8/2017 |
| AR | 104826 A2 | 8/2017 |
| CA | 2639418 A1 | 3/2009 |
| CA | 2773843 A1 | 10/2012 |
| CA | 2835904 A1 | 10/2012 |
| CA | 2845347 A1 | 10/2012 |
| CA | 2900387 A1 | 10/2012 |
| CA | 2955706 A1 | 10/2012 |
| CN | 1816684 A | 8/2006 |
| CN | 101910567 A | 10/2010 |
| CN | 102171060 A | 8/2011 |
| CN | 103375255 A | 10/2013 |
| CN | 203685377 U | 7/2014 |
| EP | 1574714 | 9/2005 |
| EP | 2678638 | 1/2014 |
| EP | 2726705 | 5/2014 |
| EP | 2904200 | 8/2015 |
| EP | 3444430 | 2/2019 |
| EP | 3444431 | 2/2019 |
| EP | 3444432 | 2/2019 |
| EP | 3447239 | 2/2019 |
| EP | 3453827 | 3/2019 |
| EP | 3456915 | 3/2019 |
| MX | 2013011673 A | 3/2014 |
| MX | 2015003978 A | 10/2015 |
| MX | 365888 B | 6/2019 |
| MX | 365889 B | 6/2019 |
| MX | 366049 B | 6/2019 |
| WO | WO 2012/137068 A2 | 10/2012 |
| WO | WO 2014053056 A1 | 4/2014 |
| WO | WO 2014/102127 A1 | 7/2014 |
| WO | WO 2015/162427 A1 | 10/2015 |
| WO | WO 2019/045687 A1 | 3/2019 |

OTHER PUBLICATIONS

China National Intellectual Property Administration, Notification to Grant Patent Right for Invention, Chinese Patent Application No. 201910721166.5, Jul. 15, 2022, 3 pages.

China National Intellectual Property Administration, Second Office Action, Chinese Patent Application No. 201910721166.5, Mar. 16, 2022, 22 pages.

EE Publishers. "Mobile Gas Turbine Units Fill the Gap for Fast Power." EE Publishers, 3 pages, 2020, [Online] [Retrieved Jul. 21, 2021], Retrieved from the internet <URL: https://www.ee.co.za/article/mobile-gas-turbine-units-fill-gap-fast-power.html>.

EPO Extended Search Report, European Application No. 15870991.5, Oct. 15, 2018, 13 pages.

EPO Search Report, European Patent Application No. 15870991.5, Oct. 15, 2018, 13 pages.

Extended Search Report, European Patent Application No. 20156440.8, Sep. 3, 2020, 7 pages.

Gardner Denver Inc., "Well Servicing Pump, Model GD-25000, GD0-25000-HD, Quintuplex Pumps, GWS Fluid End Parts List", 302FWF997 Rev H, Jul. 2008, 39 pages, Tulsa, OK.

Gardner Denver, "C-2500 Quintuplex Well Service Pump", www.gardenerdenver.com, Dec. 7, 2018, 2 pages.

Gardner Denver, Inc., "GD-2500 QuintuplexWell Service Pump", 2003, 2 pages, USA.

Gardner Denver, Inc., "Well Servicing Pump, Model GD-25000 Quintuplex, Power End Parts List", 300FWF997 Rev G, Apr. 2007, 15 pages, Tulsa, OK.

Gardner Denver, Inc., Well Servicing Pump, Model GD-25000 Quintuplex, Operating and Service Manual, B00FWF996 Revision F, Apr. 2011, 50 pages, Tulsa, OK.

Munyon et al., "The Application of Flexible Couplings for Turbomachinery", Proceedings of 18th Turbomachinery Symposium, Texas A&M University, College Station, Texas 1989, pp. 1-11.

PCT International Search Report and the Written Opinion of the International Searching Authority, or the Declaration, issued in the prosecution of application No. PCT/US 1614977, dated Nov. 21, 2016, 9 pages.

PCT International Search Report and the Written Opinion of the International Searching Authority, or the Declaration, issued in the prosecution of application No. PCT/US15166114, dated May 25, 2016, 8 pages.

PCT International Search Report and the Written Opinion of the International Searching Authority, or the Declaration, issued in the prosecution of application No. PCT/US15166133, dated Mar. 2, 2016, 9 pages.

PCT International Search Report and Written Opinion, PCT Application No. PCT/US2022/027156, Jul. 27, 2022, 14 pages.

Power Engineering International. "Distributed Generation: On the Move." Powerengineeringint.com, 7 pages, May 1, 2001, [Online] [Retrieved Jul. 21, 2021], Retrieved from the internet <URL: https://www.powerengineeringint.com/world-regions/europe/distributed-generation-on-the-move/>.

Powerpoint Presentation,"TM2500 & TM2500+ Mobile Gas Turbine Generator", from www.scawa.com/files/SCA_TM2500.pdf., Oct. 9, 2014, 24 pages.

Schlumberger Oilfield Glossary, "Triplex Pump", accessed Apr. 9, 2021, via www.glossary.oilfield.com, 1 page.

Second Office Action of Dec. 17, 2020 issued in the prosecution of Argentina Patent Application No. 20160102674, 4 pages.

Siemens. "SGT-A45 Mobile Unit: Immediate Power to the Grid—Highest Power Density, Trusted Technology." Siemens AG, Power and Gas Division, Article No. PGDG-T10034-02-7600, 2018, pp. 1-2.

United States Office Action, U.S. Appl. No. 17/379,722, filed Jun. 29, 2022, 48 pages.

(56) References Cited

OTHER PUBLICATIONS

United States Office Action, U.S. Appl. No. 17/739,715, filed Dec. 30, 2022, 9 pages.
United States Office Action, U.S. Appl. No. 17/739,715, filed Jun. 24, 2022, 16 pages.

* cited by examiner

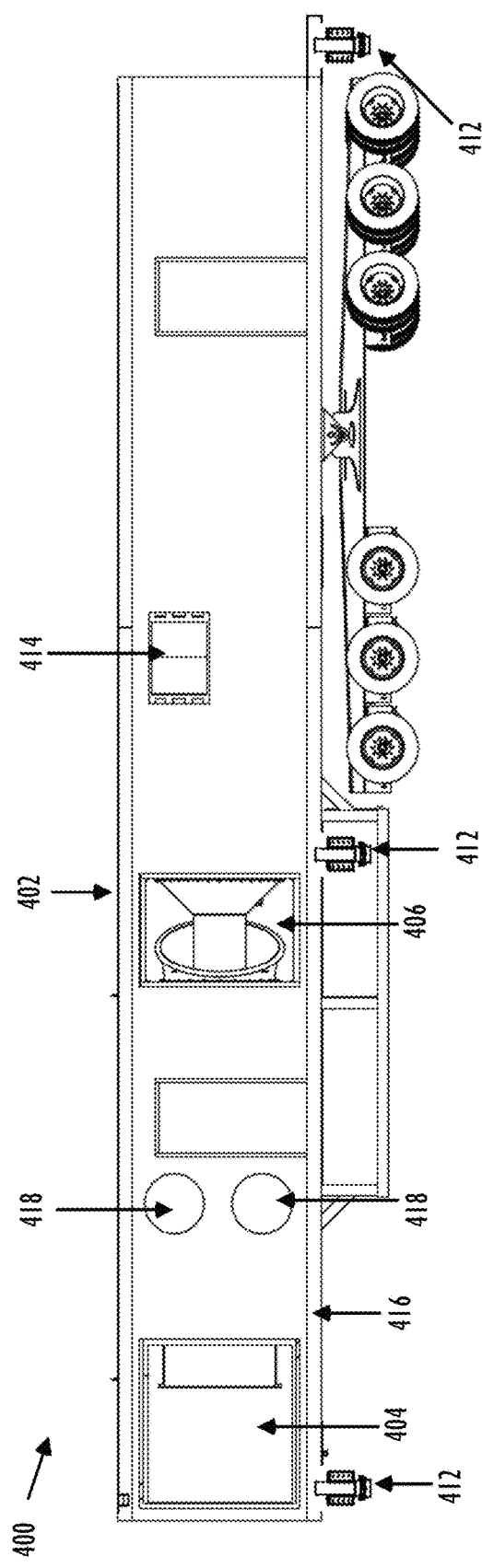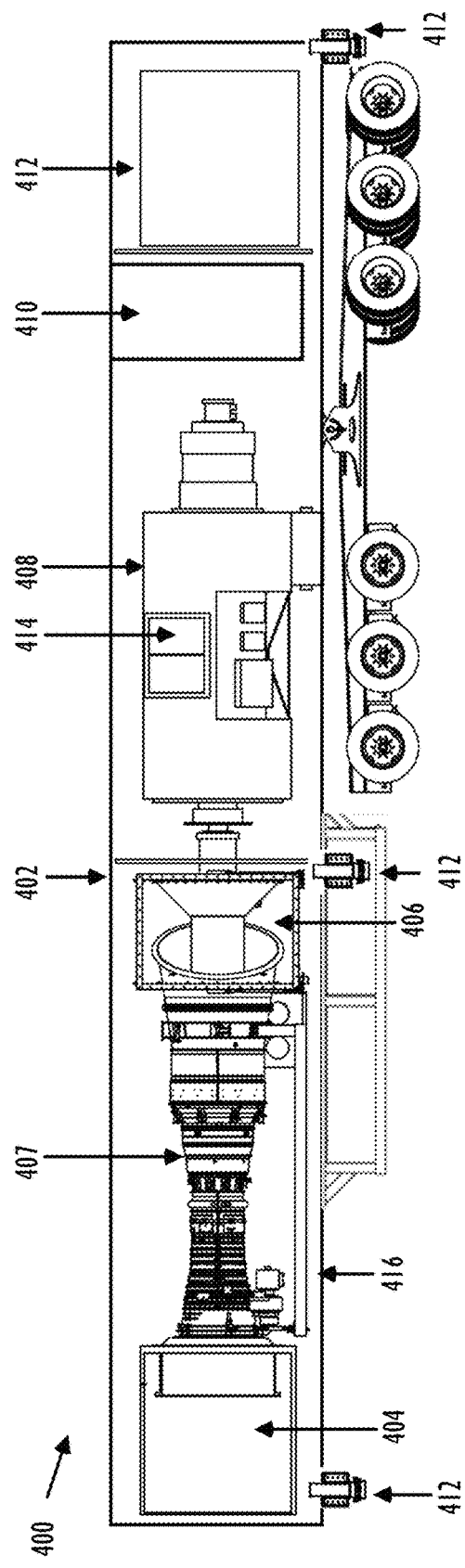
FIG. 4A
FIG. 4B

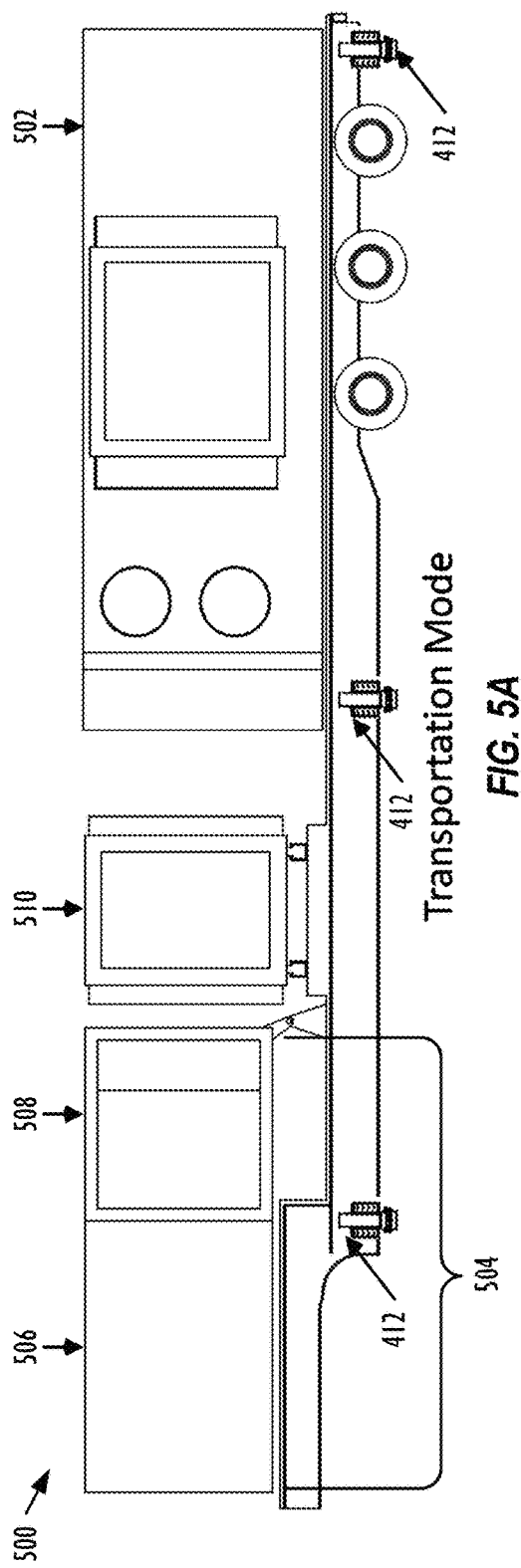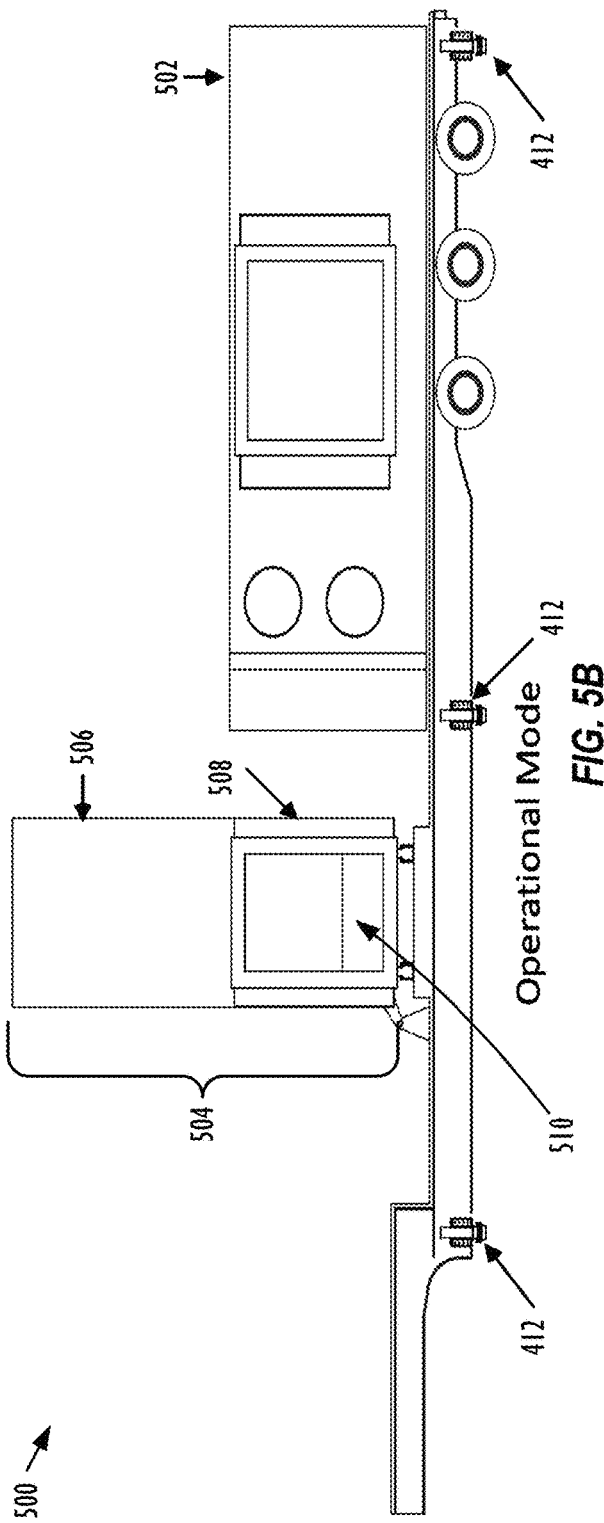

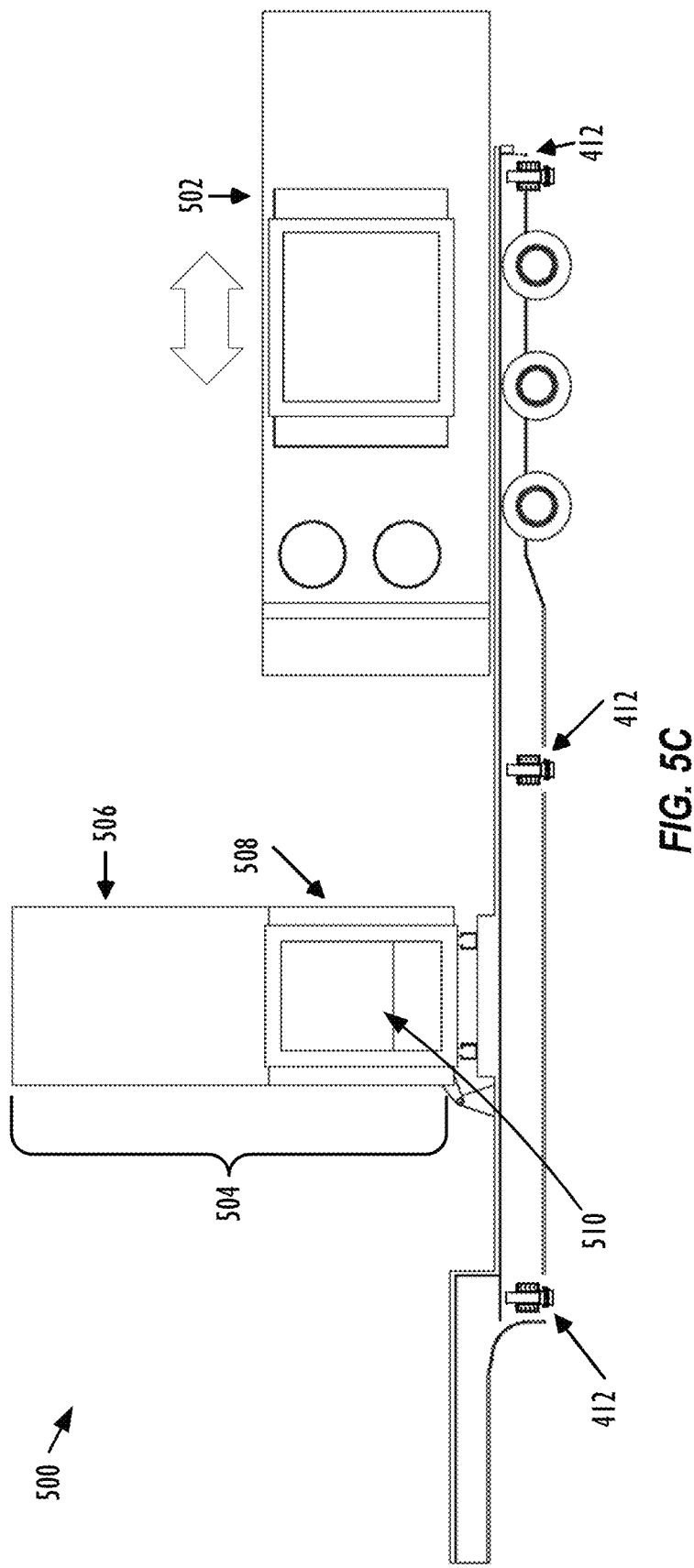

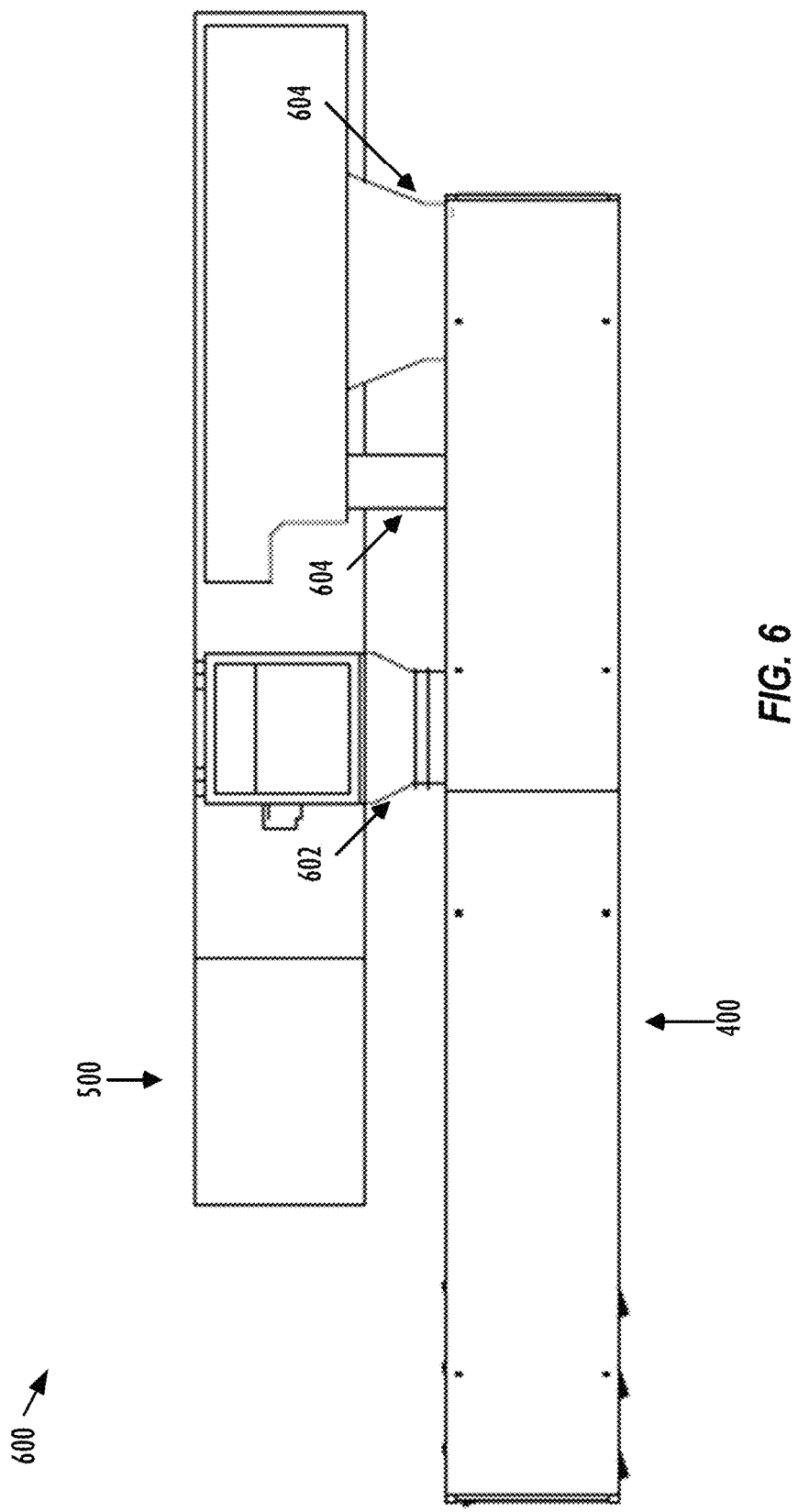

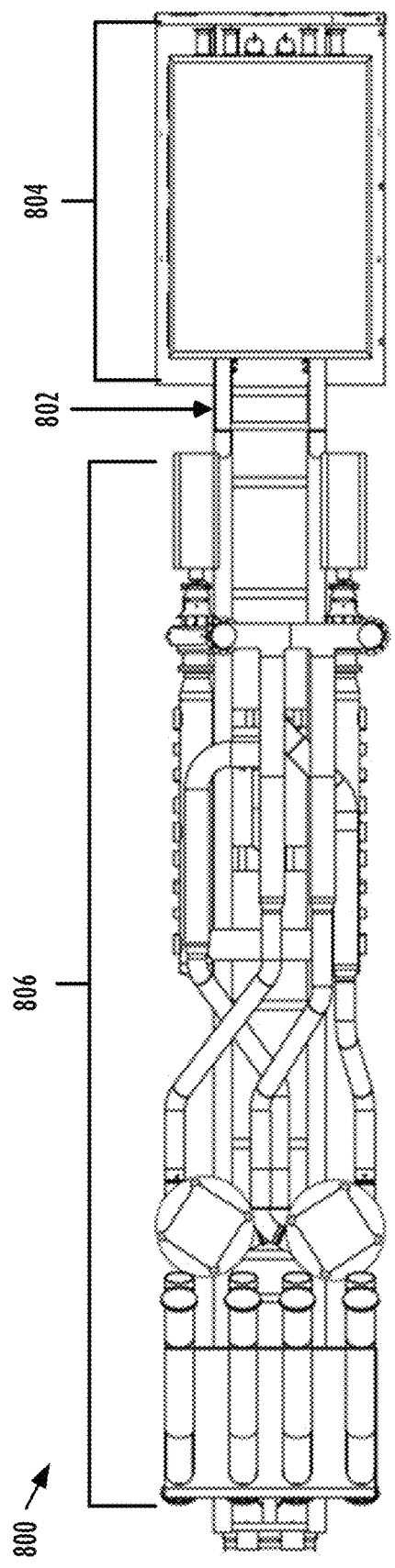
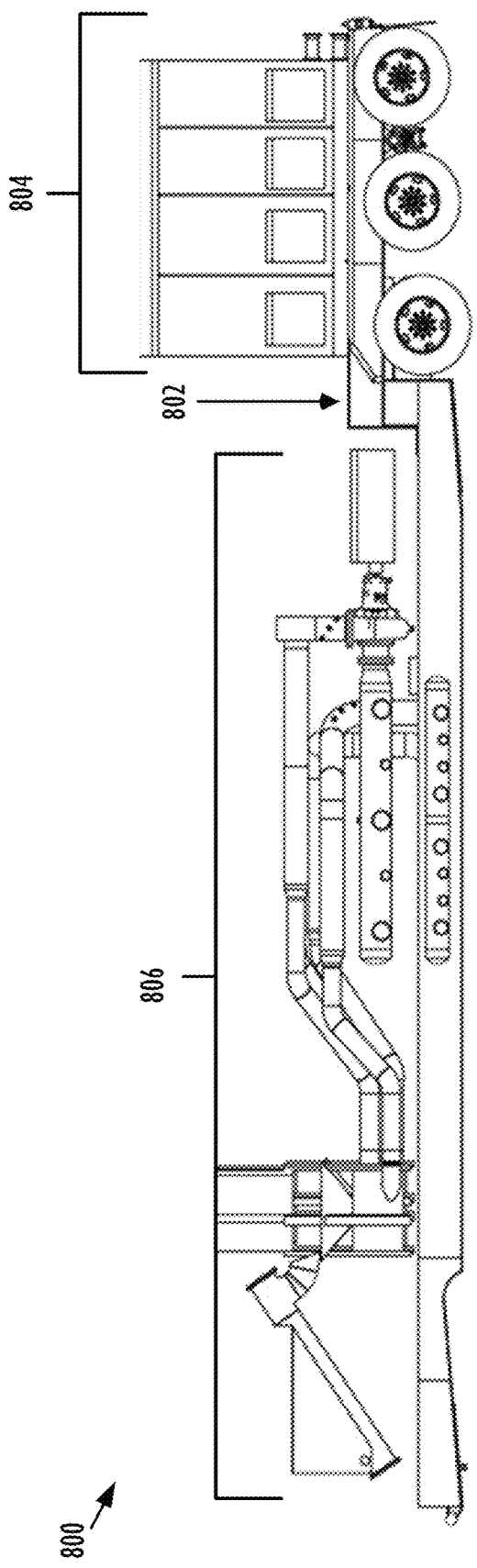
FIG. 8A
FIG. 8B

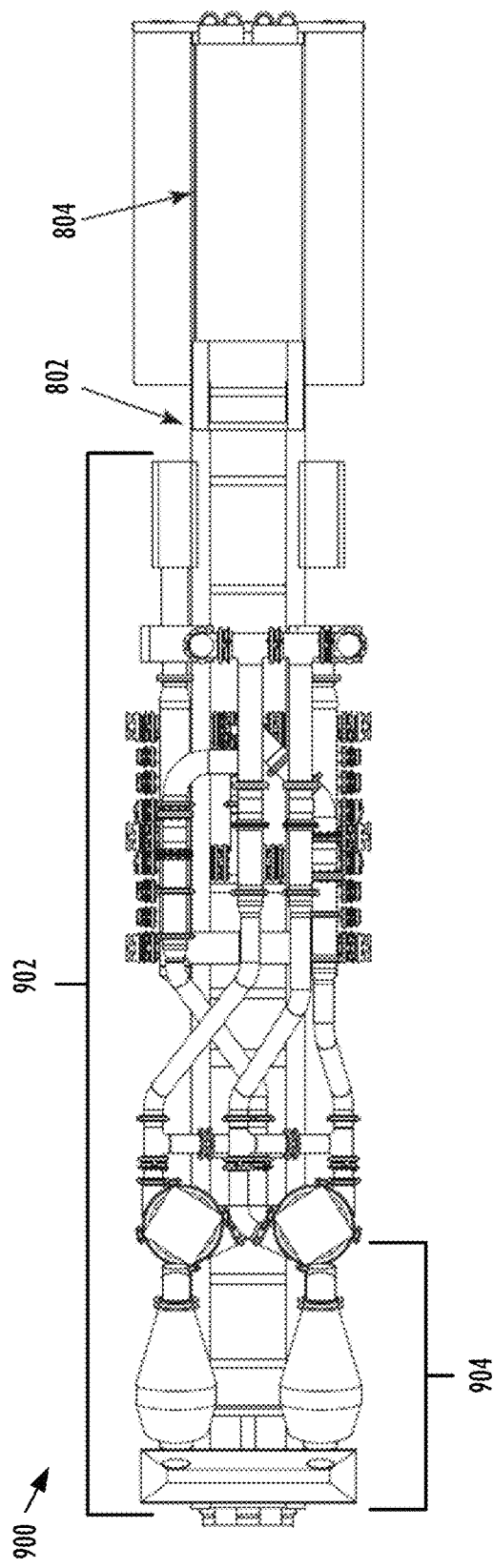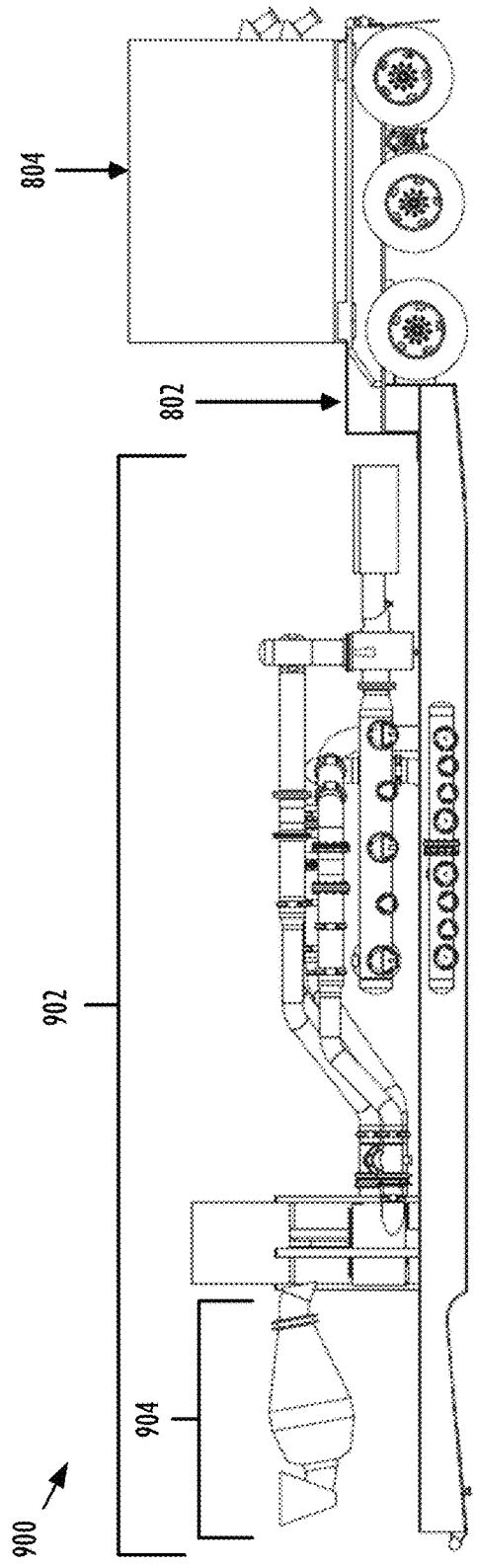
FIG. 9A
FIG. 9B

MOBILE ELECTRIC POWER GENERATION FOR HYDRAULIC FRACTURING OF SUBSURFACE GEOLOGICAL FORMATIONS

CROSS-REFERENCE TO RELATED APPLICATIONS

This application is a continuation of co-pending U.S. application Ser. No. 17/379,715, filed on Jul. 19, 2021, which claims the benefit as a continuation of U.S. application Ser. No. 16/531,913, filed on Aug. 5, 2019, which issued as U.S. Pat. No. 11,070,109, on Jul. 20, 2021, which claims the benefit as a continuation of U.S. application Ser. No. 15/385,582, filed on Dec. 20, 2016, which issued as U.S. Pat. No. 10,374,485, on Aug. 6, 2019, which claims the benefit as a continuation of U.S. application Ser. No. 14/971,555, filed on Dec. 16, 2015, which issued as U.S. Pat. No. 9,562,420, on Feb. 7, 2017, which claims the benefit of U.S. Provisional Application No. 62/094,773, filed on Dec. 19, 2014, the contents of the forgoing are incorporated herein in their entirety by reference.

BACKGROUND

Hydraulic fracturing has been commonly used by the oil and gas industry to stimulate production of hydrocarbon wells, such as oil and/or gas wells. Hydraulic fracturing, sometimes called "fracing" or "fracking" is the process of injecting fracturing fluid, which is typically a mixture of water, sand, and chemicals, into the subsurface to fracture the subsurface geological formations and release otherwise encapsulated hydrocarbon reserves. The fracturing fluid is typically pumped into a wellbore at a relatively high pressure sufficient to cause fissures within the underground geological formations. Specifically, once inside the wellbore, the pressurized fracturing fluid is pressure pumped down and then out into the subsurface geological formation to fracture the underground formation. A fluid mixture that may include water, various chemical additives, and proppants (e.g., sand or ceramic materials) can be pumped into the underground formation to fracture and promote the extraction of the hydrocarbon reserves, such as oil and/or gas. For example, the fracturing fluid may comprise a liquid petroleum gas, linear gelled water, gelled water, gelled oil, slick water, slick oil, poly emulsion, foam/emulsion, liquid carbon dioxide ($CO_2$), nitrogen gas ($N_2$), and/or binary fluid and acid.

Implementing large-scale fracturing operations at well sites typically requires extensive investment in equipment, labor, and fuel. For instance, a typical fracturing operation uses a variety of fracturing equipment, numerous personnel to operate and maintain the fracturing equipment, relatively large amounts of fuel to power the fracturing operations, and relatively large volumes of fracturing fluids. As such, planning for fracturing operations is often complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, and reducing any environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a system for providing mobile electric power, the system comprising: a gas turbine generator transport that comprises an inlet plenum and an exhaust collector and an inlet and exhaust transport coupled to the gas turbine generator transport and comprises an air inlet filter housing and an exhaust stack, wherein the inlet and exhaust transport is coupled to at least one side of the gas turbine generator transport such that the inlet plenum and the exhaust collector are not connected to the air filter housing and the exhaust stack at the top side of the gas turbine generator transport.

In another embodiment, an apparatus for providing mobile electric power comprising: a power generation transport configured to convert hydrocarbon fuel to electricity and an inlet and exhaust transport coupled to the gas turbine generator, wherein the inlet and exhaust transport is configured to: provide ventilation air and filtered combustion air to the power generation transport, collect exhaust air from the power generation transport, wherein the power generation transport and the inlet and exhaust transport is coupled to at least one side of the power generation transport such that the inlet and exhaust transport is not connected to the top side of the power generation transport.

In another embodiment, a method for providing mobile electric power, the method comprising: converting a mobile source of electricity that comprises a power generation transport and an inlet and exhaust transport from transportation mode to operation mode, coupling the power generation transport with an inlet and exhaust transport using one or more expansion connections, wherein the power generation transport and the inlet and exhaust transport is coupled to at least one side of the power generation transport such that the inlet and exhaust transport is not connected to the top side of the power generation transport, and generating electricity using the mobile source of electricity to power fracturing operations for one or more well sites.

In another embodiment, a system for pumping and pressurizing fracturing fluid, the system comprising: a source of electric power and a fracturing pump transport coupled to the source of the electric power comprising: a dual shaft electric prime mover that comprises a shaft that protrudes at opposite sides of the dual shaft electric prime mover, a first pump coupled to a first end of the shaft, and a second pump coupled to a second end of the shaft.

In another embodiment, a fracturing pump transport comprising: a first pump configured to pressurize and pump fracturing fluid, a second pump configured to pressurize and pump the fracturing fluid, and a dual shaft electric motor comprises a shaft and configured to receive electric power from a power source and drive in parallel, both the first pump and the second pump with the shaft.

In another embodiment, a method for pumping and pressurizing fracturing fluid, the method comprising: receiving electric power to power a dual shaft electric prime mover at a fracturing pump transport, receiving fracturing fluid at the fracturing pump transport from one or more electric blenders, driving in parallel a plurality of pumps of the fracturing pump transport using the dual shaft electric prime mover to pressurize fracturing fluid, and pumping the pressurized fluid from the fracturing pump transport into a wellhead.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4A is a schematic diagram of an embodiment of the gas turbine generator transport.

FIG. 4B is a schematic diagram of an embodiment of the gas turbine generator transport.

FIG. 5A is a schematic diagram of an embodiment of an inlet and exhaust transport.

FIG. 5B is a schematic diagram of an embodiment of an inlet and exhaust transport.

FIG. 5C is a schematic diagram of an embodiment of an inlet and exhaust transport that includes a sliding air inlet filter housing.

FIG. 6 is a schematic diagram of an embodiment of the two transport mobile electric power source when in operational mode.

FIG. 8A is a schematic diagram of an embodiment of a blender transport that includes an electric blender.

FIG. 8B is a schematic diagram of an embodiment of a blender transport that includes an electric blender.

FIG. 9A of an embodiment of a blender transport that includes an electric blender with enclosed mixer hoppers.

FIG. 9B of an embodiment of a blender transport that includes an electric blender with enclosed mixer hoppers.

Figure 1:
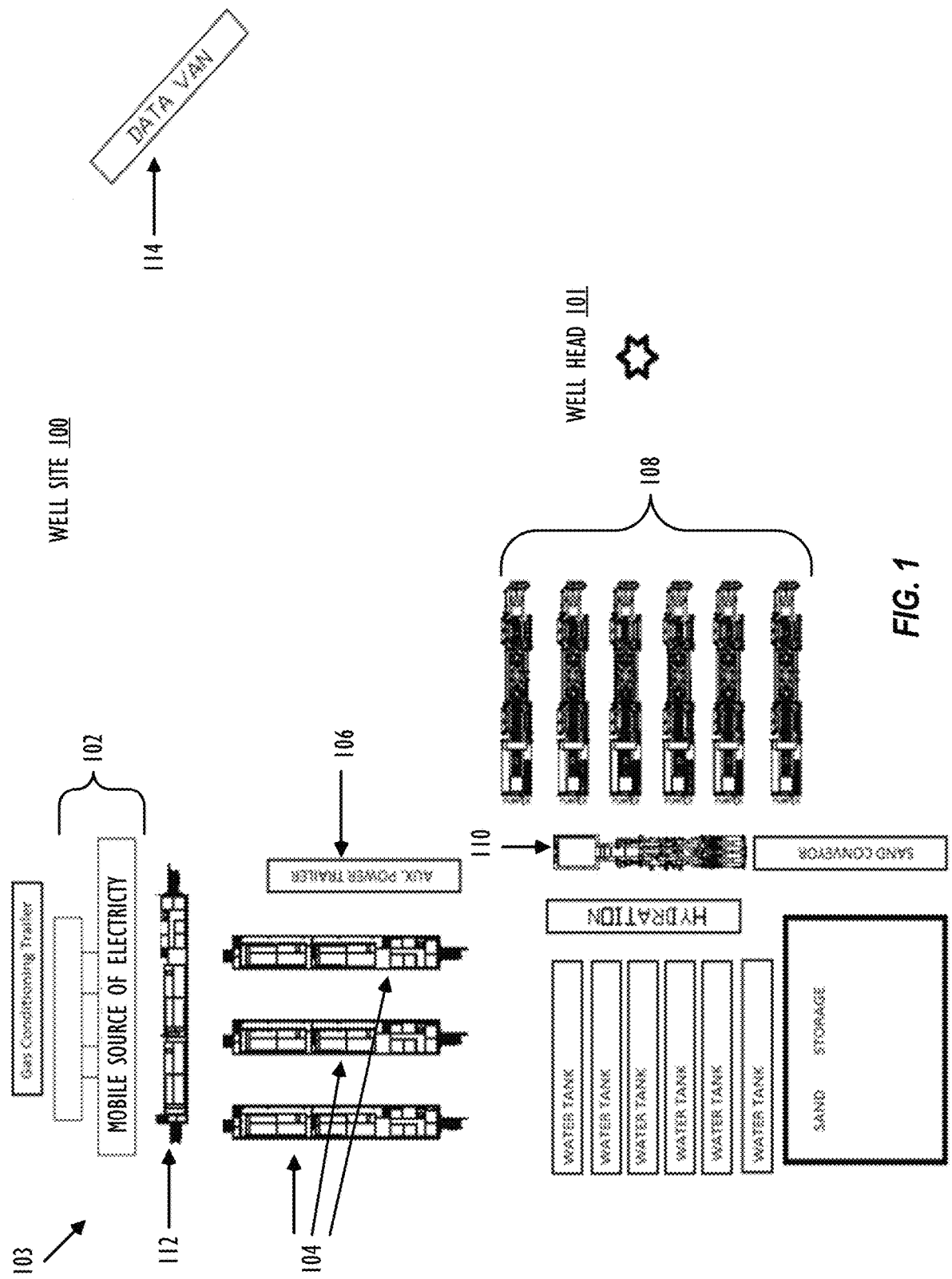
FIG. 1 is a schematic diagram of an embodiment of a well site, where various embodiments may operate within.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

As used herein, the term "transport" refers to any transportation assembly, including, but not limited to, a trailer, truck, skid, and/or barge used to transport relatively heavy structures, such as fracturing equipment.

As used herein, the term "trailer" refers to a transportation assembly used to transport relatively heavy structures, such as fracturing equipment that can be attached and/or detached from a transportation vehicle used to pull or move the trailer. In one embodiment, the trailer may include the mounts and manifold systems to connect the trailer to other fracturing equipment within a fracturing system or fleet.

As used herein, the term "lay-down trailer" refers to a trailer that includes two sections with different vertical heights. One of the sections or the upper section is positioned at or above the trailer axles and another section or the lower section is positioned at or below the trailer axles. In one embodiment the main trailer beams of the lay-down trailer may be resting on the ground when in operational mode and/or when uncoupled from a transportation vehicle, such as a tractor.

As used herein, the term "gas turbine generator" refers to both the gas turbine and the generator sections of a gas-turbine generator transport. The gas turbine generator receives hydrocarbon fuel, such as natural gas, and converts the hydrocarbon fuel into electricity.

As used herein, the term "inlet plenum" may be interchanged and generally referred to as "inlet", "air intake," and "intake plenum," throughout this disclosure. Additionally, the term "exhaust collector" may be interchanged throughout and generally referred to as "exhaust diffuser" and "exhaust plenum" throughout this disclosure.

As used herein, the term "gas turbine inlet filter" may be interchanged and generally referred to as "inlet filter" and "inlet filter assembly." The term "air inlet filter housing" may also be interchanged and generally referred to as "filter housing" and "air filter assembly housing" throughout this disclosure. Furthermore, the tem "exhaust stack" may also be interchanged and generally referred to as "turbine exhaust stack" throughout this disclosure.

Various example embodiments are disclosed herein that provide mobile electric fracturing operations for one or more well sites. To provide fracturing operations, a mobile source of electricity may be configured to provide electric power to a variety of fracturing equipment located at the well sites. The mobile source of electricity may be implemented using at least two transports to reduce its "footprint" at a site. One transport, the power generation transport, may comprise a gas turbine and generator along with ancillary equipment that supplies electric power to the well sites. For example, the power generation transport may produce electric power in the ranges of about 15-35 megawatt (MW) when providing electric power to a single well site. A second transport, the inlet and exhaust transport, may comprise one or more gas turbine inlet air filters and a gas turbine exhaust stack. The power generation transport and the inlet and exhaust transport may be arranged such that the inlet and exhaust are connected at the side of the gas turbine enclosure rather than through the top of the gas turbine enclosure. In one embodiment, the mobile source of electricity may comprise a third supplemental transport, an auxiliary gas turbine generator transport, that provides power to ignite, start, or power on the power generation transport and/or provide ancillary power where peak electric power demand exceeds the electric power output of the gas turbine generator transport. The auxiliary gas turbine generator transport may comprise a smaller gas turbine generator than the one used in the power generation transport (e.g., provides about 1-8 MW of electric power).

Also disclosed herein are various example embodiments of implementing mobile fracturing operations using a fracturing pump transport that comprises a dual shaft electric motor configured to drive at least two pumps. The dual shaft electric motor may be an electric motor configured to operate within a desired mechanical power range, such as about 1,500 horsepower (HP) to about 10,000 HP. Each of the pumps may be configured to operate within a desired mechanical power range, such as about 1,500 HP to about 5,000 HP, to discharge fracturing fluid at relatively high pressures (e.g., about 10,000 pounds per square inch (PSI)). In one embodiment, the pumps may be plunger-style pumps that comprise one or more plungers to generate the high-pressure fracturing fluid. The fracturing pump transport may mount and couple the dual shaft electric motor to the pumps using sub-assemblies that isolate and allow operators to remove the pumps and/or the dual shaft electric motor individually and without disconnecting the fracturing pump transport from the mobile fracturing system.

The disclosure also includes various example embodiments of a control network system that monitors and controls one or more hydraulic fracturing equipment remotely. The different fracturing equipment, which include, but are not limited to, a blender, hydration unit, sand handling equipment, chemical additive system, and the mobile source of electricity, may be configured to operate remotely using a network topology, such as an Ethernet ring topology network. The control network system may remove implementing control stations located on and/or in close proximity to the fracturing equipment. Instead, a designated location, such as a data van and/or a remote location away from the vicinity of the fracturing equipment may remotely control the hydraulic fracturing equipment.

FIG. 1 is a schematic diagram an embodiment of a well site 100 that comprises a wellhead 101 and a mobile fracturing system 103. Generally, a mobile fracturing system 130 may perform fracturing operations to complete a well and/or transform a drilled well into a production well. For example, the well site 100 may be a site where operators are in the process of drilling and completing a well. Operators may start the well completion process with vertical drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in, cement. The operators may be subsequently pack the rig, and a mobile fracturing system 103 may be moved onto the well site 100 to perform fracturing operations that force relatively high pressure fracturing fluid through wellhead 101 into subsurface geological formations to create fissures and cracks within the rock. The fracturing system 103 may be moved off the well site 100 once the operators complete fracturing operations. Typically, fracturing operations for well site 100 may last several days.

To provide an environmentally cleaner and more transportable fracturing fleet, the mobile fracturing system 103 may comprise a mobile source of electricity 102 configured to generate electricity by converting hydrocarbon fuel, such as natural gas, obtained from one or more other sources (e.g., a producing wellhead) at well site 100, from a remote offsite location, and/or another relatively convenient location near the mobile source of electricity 102. Improving mobility of the mobile fracturing system 103 may be beneficial because fracturing operations at a well site typically last for several days and the fracturing equipment is subsequently removed from the well site after completing fracturing operation. Rather than using fuel that significantly impacts air quality (e.g., diesel fuel) as a source of power and/or receiving electric power from a grid or other type of stationary power generation facility (e.g., located at the well site or offsite), the mobile fracturing system 103 utilizes a mobile source of electricity 102 as a power source that burns cleaner while being transportable along with other fracturing equipment. The generated electricity from mobile source of electricity 102 may be supplied to fracturing equipment to power fracturing operations at one or more well sites. As shown in FIG. 1, the mobile source of electricity 102 may be implemented using two transports in order to reduce the well site footprint and the ability for operators to move the mobile source of electricity 102 to different well sites and/or different fracturing jobs. Details regarding implementing the mobile source of electricity 102 are discussed in more detail in FIGS. 4A-6.

The mobile source of electricity 102 may supply electric power to fracturing equipment within the mobile fracturing system 103 that may include, but are not limited to at least one switch gear transport 112, a plurality of drive power transports 104, at least one auxiliary power transport 106, at least one blender transport 110, at least one data van 114 and a plurality of fracturing pump transports 108 that deliver fracturing fluid through wellhead 101 to subsurface geological formations. The switch gear transport 112 may receive the electricity generated from the mobile source of electric power 102 via one or more electrical connections. In one embodiment, the switch gear transport 112 may use 13.8 kilovolts (KV) electrical connections to receive power from the mobile source of electric power 102. The switch gear transport 112 may comprise a plurality of electrical disconnect switches, fuses, transformers, and/or circuit protectors to protect the fracturing equipment. The switch gear transport 112 may transfer the electricity received from the mobile source of electricity 102 to the drive power transports 104 and auxiliary power transports 106.

The auxiliary power transport 106 may comprise a transformer and a control system to control, monitor, and provide power to the electrically connected fracturing equipment. In one embodiment, the auxiliary power transport 106 may receive the 13.8 KV electrical connection and step down the voltage to 4.8 KV, which is provided to other fracturing equipment, such as the fracturing pump transport 108, the blender transport 110, sand storage and conveyor, hydration equipment, chemical equipment, data van 114, lighting equipment, and any additional auxiliary equipment used for the fracturing operations. The auxiliary power transport 106 may step down the voltage to 4.8 KV rather than other voltage levels, such as 600 V, in order to reduce cable size for the electrical connections and the amount of cabling used to connect the mobile fracturing system 103. The control system may be configured to connect to a control network system such that the auxiliary power transport 106 may be monitored and/or controlled from a distant location, such as the data van 114 or some other type of control center.

The drive power transports 104 may be configured to monitor and control one or more electrical motors located on the fracturing pump transports 108 via a plurality of connections, such as electrical connections (e.g., copper wires), fiber optics, wireless, and/or combinations thereof. The connections are omitted from FIG. 1 for clarity of the drawing. The drive power transports 104 may be part of the control network system, where each of the drive power transports 104 comprise one or more variable frequency drives (VFDs) used to monitor and control the prime movers on the fracturing pump transports 108. The control network system may communicate with each of the drive power transports 104 to monitor and/or control each of the VFDs. The VFDs may be configured to control the speed and torque of the prime movers by varying the input frequency and voltage to the prime movers. Using FIG. 1 as an example, each of the drive power transports 104 may be configured to drive a plurality of the fracturing pump transports 108. Other drive power transport to fracturing pump transport ratios may be used as desired. In one embodiment, the drive power transports 104 may comprise air filters and blowers that intake ambient air to cool the VFDs. Other embodiments of the drive power transports 104 may use an air conditioning units and/or water cooling to regulate the temperature of the VFDs.

The fracturing pump transport 108 may receive the electric power received from the drive power transport 104 to power a prime mover. The prime mover converts electric power to mechanical power for driving one or more pumps. In one embodiment, the prime mover may be a dual shaft electric motor that drives two different pumps. The fracturing pump transport 108 may be arranged such that one pump is coupled to opposite ends of the dual shaft electric motor and avoids coupling the pumps in series. By avoiding coupling the pump in series, the fracturing pump transport 108 may continue to operate when either one of the pumps fails or have been removed from the fracturing pump transport 108. Additionally, repairs to the pumps may be performed without disconnecting the system manifolds that connect the fracturing pump transport 108 to other fracturing equipment within the mobile fracturing system 103 and wellhead 101. Details regarding implementing the fracturing pump transport 108 are discussed in more detail in FIGS. 7A-7B.

The blender transport 110 may receive the electric power fed through the auxiliary power transport 106 to power a plurality of electric blenders. A plurality of prime movers may drive one or more pumps that pump source fluid and blender additives (e.g., sand) into a blending tub, mix the source fluid and blender additives together to form fracturing fluid, and discharge the fracturing fluid to the fracturing pump transport 108. In one embodiment, the electric blender may be a dual configuration blender that comprises electric motors for the rotating machinery that are located on a single transport, which is described in more detail in U.S. Patent Application Publication No. 2012/0255734, filed Apr. 6, 2012 by Todd Coli et al. and entitled "Mobile, Modular, Electrically Powered System for use in Fracturing Underground Formations," which is herein incorporated by reference in its entirety. In another embodiment, a plurality of enclosed mixer hoppers may be used to supply the proppants and additives into a plurality of blending tubs. The electric blender that comprises the enclosed mixer hoppers are discussed in more detail in FIGS. 9A and 9B.

The data van 114 may be part of a control network system, where the data van 114 acts as a control center configured to monitor and provide operating instructions in order remotely operate the blender transport 110, the mobile source of electricity 102, and fracturing pump transport 108 and/or other fracturing equipment within the mobile fracturing system 103. For example, the data van 114 may communicate via the control network system with the VFDs located within the drive power transports 104 that operate and monitor the health of the electric motors used to drive the pumps on the fracturing pump transports 108. In one embodiment, the data van 114 may communicate with the variety of fracturing equipment using a control network system that has a ring topology. A ring topology may reduce the amount of control cabling used for fracturing operations and increase the capacity and speed of data transfers and communication. Details regarding implementing the control network system are discussed in more detail in FIG. 10.

Other fracturing equipment shown in FIG. 1, such as gas conditioning transport, water tanks, chemical storage of chemical additives, hydration unit, sand conveyor, and sandbox storage are known by persons of ordinary skill in the art, and therefore are not discussed in further detail. In one or more embodiments of the mobile fracturing system 103, one or more of the other fracturing equipment shown in FIG. 1 may be configured to receive power generated from the mobile source of electricity 102. Additionally, as shown in FIG. 1, one or more embodiments of the mobile fracturing system 103 may not include the use of a missile that receives low-pressure fluid and releases high-pressure fluid towards the wellhead 101. The control network system for the mobile fracturing system 103 may remotely synchronizes and/or slaves the electric blender of the blender transport 110 with the electric motors of the fracturing pump transports 108. Unlike a conventional diesel powered blender, the electric blenders may perform rate changes to the pump rate change mounted on the fracturing pump transports 108. In other words, if the pumps within the fracturing pump transports 108 perform a rate change increase, the electric blender within a blender transport 110 may also automatically compensate its rate and ancillary equipment, such as the sand conveyor, to accommodate the rate change. Manual commands from an operator may not be used to perform the rate change.

Figure 2:
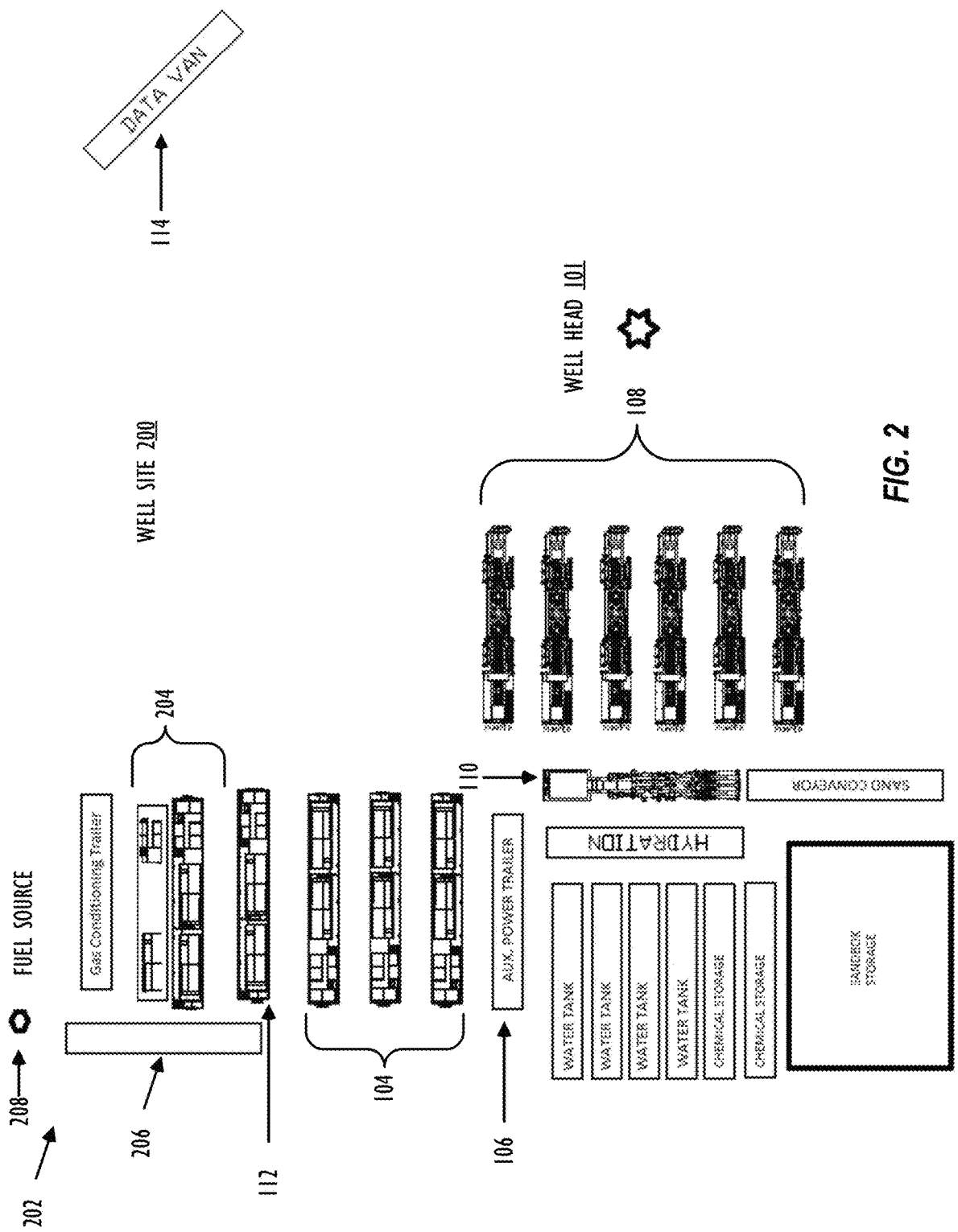
FIG. 2 is a schematic diagram an embodiment of a well site that includes a mobile source of electricity that comprises three transports for a mobile fracturing system.

FIG. 2 is a schematic diagram an embodiment of a well site 200 that includes a mobile source of electricity 204 that comprises three transports for the mobile fracturing system 202. The mobile fracturing system 202 may be substantially similar to mobile fracturing system 103, except that mobile fracturing system comprises an auxiliary gas turbine generator transport 206. The auxiliary gas turbine generator transport 206 may be configured to provide power to ignite, start, or power on the mobile source of electricity 204 and/or provide ancillary power where peak electric power demand exceeds the electric power output of a gas turbine generator transport. The auxiliary gas turbine generator transport may comprise a smaller, gas turbine or diesel generator that generates less power (e.g., provides about 1-8 MW of electric power) than the one used in the gas turbine generator transport. Additionally or alternatively, the auxiliary gas turbine generator transport 206 may provide testing, standby, peaking, and/or other emergency backup power functionality for the mobile fracturing system 202.

FIG. 2 illustrates that the mobile fracturing system 202 arranges and positions the drive power transport 104 and the auxiliary power transport 106 in an orientation that is about parallel to the switch gear transport 112 and the fracturing pump transports 108. Positioning the drive power transport 104 and the auxiliary power transport 106 in a parallel orientation rather than about a perpendicular orientation as shown in FIG. 1 may be beneficial, for example reducing the foot print of the mobile fracturing system 202. Moreover, FIG. 2 also illustrates that a fuel source 208, such as natural gas from a producing wellhead, may be located at the well site and be used by the mobile source of electricity 204 to generate electricity.

Although FIGS. 1 and 2 illustrate a specific configuration for a mobile fracturing system 103 at a well site 100, the disclosure is not limited to that application and/or the specific embodiment illustrated in FIGS. 1 and 2. For instance, embodiments of the present disclosure may include a plurality of wellheads 101, a plurality of blender transports 110, and a plurality of auxiliary power transports 106. Additionally, the mobile source of electricity 102 is not limited for use in a fracturing operation and may be applicable to power other types of equipment and devices not typically used in a fracturing operation. The use and discussion of FIGS. 1 and 2 is only an example to facilitate ease of description and explanation.

Figure 3:
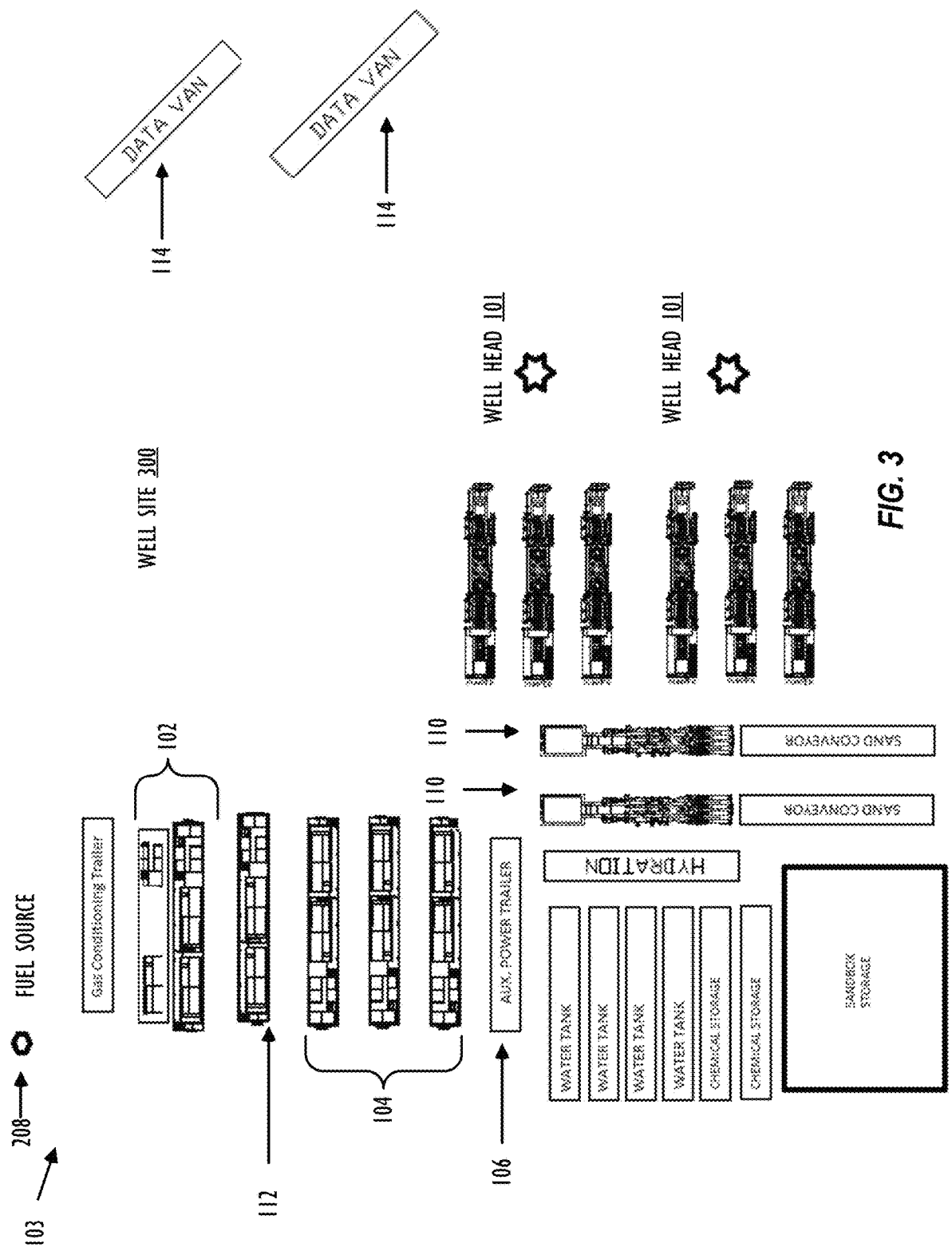
FIG. 3 is a schematic diagram an embodiment of a well site that includes two wellheads and two data vans.

FIG. 3 is a schematic diagram an embodiment of a well site 300 that includes two wellheads 101 and two data vans 114. The two data vans 114 may be part of the control network system that simultaneously monitors and provides operating instructions to the two different wellheads 101. An additional blender transport 110 may be added to provide fracturing fluid to fracturing pump transports 108 used to fracture the subsurface geological structure underneath the second wellhead 101. Although FIG. 3 illustrates that both wellheads 101 are located on the same well site 300, other embodiments may have the wellheads 101 located at different well sites.

Mobile Source of Electricity

The mobile source of electricity may be part of the mobile fracturing system used at a well site as described in FIGS. 1-3. In other words, the mobile source of electricity may be configured to be transportable to different locations (e.g., different well sites) along with other fracturing equipment (e.g., fracturing pump transports) that are part of the mobile fracturing system and may not be left behind after completing fracturing operations. The mobile source of electricity may include at least two different transports that improve mobility of the dedicated electric power by simplifying and minimizing the operations for the mobilization and de-mobilization process. For example, the mobile source of electricity may improve mobility by enabling a mobilization and de-mobilization time period of about 24 hours. The mobile source of electricity also incorporates a two transport footprint, where the same two transport system may be used for transportation and operation modes. Although FIGS. 4A-6 illustrate embodiments of implementing a mobile source of electricity using two different transports, other embodiments of the mobile source of electricity may mount the gas turbine generator, air inlet filter housing, gas turbine exhaust stack, and other components shown in FIGS. 4A-6 on a different number of transports (e.g., all on one transport or more than two transports). To provide electric power for fracturing operations at one or more locations (e.g., well sites), the mobile source of electricity be designed to unitize and mobilize a gas-turbine and generator adapted to convert hydrocarbon fuel, such as natural gas, into electricity.

FIGS. 4A and 4B are schematic diagrams of an embodiment of the gas turbine generator transport 400. FIG. 4A illustrates a side-profile view of the gas turbine generator transport 400 with a turbine enclosure 402 that surrounds components within the gas turbine generator transport 400 and includes cavities for the inlet plenum 404, exhaust collector 406, and an enclosure ventilation inlet 418. FIG. 4B illustrates a side-profile view of the gas turbine generator transport 400 that depicts the components within the turbine enclosure 402. As shown in FIG. 4B, the gas turbine generator transport 400 may comprise the following equipment: (1) an inlet plenum 404; (2) a gas turbine 407 (e.g., General Electric (GE) 2500); (3) an exhaust collector 406; (4) a generator 408; (5) a generator breaker 410; and (6) a control system 412. Other components not shown in FIG. 4B, but which may also be located on the gas turbine generator transport 400 include a turbine lube oil system, a fire suppression system, and a generator lube oil system.

The gas turbine generator transport 400 includes the gas turbine 407 to generate mechanical enemy (i.e., rotation of a shaft) from a hydrocarbon fuel source, such as natural gas, liquefied natural gas, condensate, and/or other liquid fuels. As shown in FIG. 4B, the gas turbine shaft is connected to the generator 408 such that the generator 408 converts the supplied mechanical energy from the rotation of the shaft to produce electric power. The gas turbine 407 may be a gas turbine, such as the GE LM2500 family of gas turbines, the Pratt and Whitney FT8 gas turbines, or any other gas turbine that generates enough mechanical power for a generator 408 to power fracturing operations at one or more well sites. The generator 408 may be a Brush BD AX 62-170ER generator or any other generator configured to generate electric power for fracturing operations at one or more well sites. For example, the gas turbine 407 and generator 408 combination within a gas turbine generator transport 400 may generate electric power from a range of at least about 15 megawatt (MW) to about 35 MW. Other types of gas-turbine generators with power ranges greater than about 35 MW or less than about 15 MW may also be used depending on the amount of power needed at the well sites. In one embodiment, to increase mobility of the gas turbine generator transport 400, the gas turbine 407 may be configured to fit within a dimension of about 14.5 feet long and about four feet in diameter and/or the generator 408 may be configured to fit within a dimension of about 18 feet long and about 7 feet wide.

The generator 408 may be housed within the turbine enclosure 402 that includes air ventilation fans internal to the generator 408 that draws air into the air inlet located on the front and/or back of the generator 408 and discharges air out on the sides via the air outlets 414. Other embodiments may have the air outlets positioned on different locations of the enclosure for the generator 408. In one embodiment, the air inlet may be inlet louvres and the air outlets may be outlet louvres that protect the generator from the weather elements. A separate generator ventilation stack unit may be mounted on the top of the gas turbine generator transport 400.

The turbine enclosure 402 may also comprise gas turbine inlet filter(s) configured to provide ventilation air and combustion air via one or more inlet plenums 404 to the gas turbine 407. Additionally, enclosure ventilation inlets 418 may be added to increase the amount of ventilation air. The ventilation air may be air used to cool the gas turbine 407 and ventilate the gas turbine enclosure 402. The combustion air may be the air that is supplied to the gas turbine 407 to aid in the production of the mechanical energy. The inlet plenum 404 may be configured to collect the intake air from the gas turbine inlet filter and supply the intake air to the gas turbine. The exhaust collector 406 may be configured to collect the air exhaust from the gas turbine and supply the exhaust air to the gas turbine exhaust stack.

To improve mobility of the gas turbine generator transport 400, the air inlet filter housing and the gas turbine exhaust stack are configured to be connected from at least one of the sides of the turbine enclosure 402, as opposed to connecting both the air inlet filter housing and the gas turbine exhaust stack on the top of the turbine enclosure 402 or connecting the air inlet filter housing at one end of the gas turbine generator transport 400 and connecting the exhaust collector from the side of the turbine enclosure 402. The air inlet filter housing and gas turbine exhaust stack from the inlet and exhaust transport may connect with the turbine enclosure 402 using one or more expansion connections that extend from one or both of the transports, located at the sides of the turbine enclosure 402. Any form of connection may be used that provides coupling between the turbine enclosure 402 and the air inlet filter housing and gas turbine exhaust stack without using a crane, forklift, and/or any other external mechanical means to connect the expansion connections in place and/or to connect the air inlet filter housing and gas turbine exhaust stack to the side of the turbine enclosure 402. The expansion connections may comprise a duct and/or an expansion joint to connect the air inlet filter housing and gas turbine exhaust stack to the turbine enclosure 402. Additionally, the routing of the air inlet filter housing and gas turbine exhaust stack via the sides of the turbine enclosure 402 may provide a complete aerodynamic modeling where the inlet air flow and the exhaust air flow are used to achieve the gas turbine nameplate output rating. The inlet and exhaust transport is discussed in more detail later in FIGS. 5A and 5B.

To improve mobility over a variety of roadways, the gas turbine generator transport 400 in FIGS. 4A and 4B may have a maximum height of about 13 feet and 6 inches, a maximum width of about 8 feet and 6 inches, and a maximum length of about 66 feet. Further, the gas turbine generator transport 400 may comprise at least three axles used to support and distribute the weight on the gas turbine generator transport 400. Other embodiments of the gas turbine generator transport 400 may be transports that exceed three axles depending on the total transport weight. The dimensions and the number of axles may be adjusted to allow for the transport over roadways that typically mandate certain height, length, and weight restrictions.

In one embodiment, the gas turbine 407 and generator 408 may be mounted to an engineered transport frame 416, a sub-base, sub-skid, or any other sub-structure used to support the mounting of gas turbine 407 and generator 408. The single engineered transport frame may be used to align the connections between the gas turbine 407, the generator 408, the inlet plenum 404 and the exhaust collector 406 and/or lower the gas turbine and generator by configuring for a flush mount to the single engineered transport frame 416. The single engineered transport frame 416 may allow for easier alignment and connection of the gas turbine 407 and generator 408 compared to using separate sub-base for the gas turbine 407 and generator 408. Other embodiments of the gas turbine generator transport 400 may use a plurality of sub-bases, for example, mounting the gas turbine 407 on one sub-base and mounting the generator 408 on another sub-base.

FIG. 4B illustrates that the generator breaker 410 and control systems 412 may be located on the gas turbine generator transport 400. The generator breaker 410 may comprise one or more circuit breakers that are configured to protect the generator 408 from current and/or voltage fault conditions. The generator breaker 410 may be a medium voltage (MV) circuit breaker switchboard. In one embodiment, the generator breaker may be about three panels, two for the generator and one for a feeder that protect relays on the circuit breaker. In one embodiment, the generator breaker 410 may be vacuum circuit breaker. The control system 412 may be configured to control, monitor, regulate, and adjust the power output of the gas turbine 407 and generator 408. For example, the control system 412 may monitor and balance the load produced by the fracturing operations by generating enough electric power to match the load demands. The control system 412 may also be configured to synchronize and communicate with a control network system that allows a data van or other computing systems located in a remote location (e.g., off the well site) to control, monitor, regulate, and adjust power output of the generator 408. Although FIG. 4B illustrates that the generator breaker 410 and/or control system 412 may be mounted on the gas turbine generator transport 400, other embodiments of the mobile source of electricity may mount the generator breaker 410 and/or control system 412 in other locations (e.g. switch gear transport).

Other equipment that may also be located on the gas turbine generator transport 400, but are not shown in FIGS. 4A and 4B include the turbine lube oil system, gas fuel valves, generator lube oil system, and fire suppression system. The lube oil systems or consoles, which generally refer to both the turbine lube oil system and generator lube oil system within this disclosure, may be configured to provide a generator and turbine lube oil filtering and cooling systems. In one embodiment, the turbine lube oil console area of the transport may also contain the fire suppression system, which may comprise sprinklers, water mist, clean agent, foam sprinkler, carbon dioxide, and/or other equipment used to suppress a fire or provide fire protection for the gas turbine 407. The mounting of the turbine lube oil consoles and the fire suppression system onto the gas turbine generator transport 400 reduces this transport's footprint by eliminating the need for an auxiliary transport and connections for the turbine and generator lube oil, filtering, cooling systems and the fire suppression system to the gas turbine generator transport. The turbine and generator lube oil systems may be mounted on a skid that is located underneath the generator 408 or any other location on the gas turbine generator transport 400.

FIGS. 5A and 5B are schematic diagrams of embodiments of an inlet and exhaust transport 500. Specifically, FIG. 5A depicts the inlet and exhaust transport 500 while in transportation mode and FIG. 5B depicts the inlet and exhaust transport 500 while in operational mode. As shown in FIGS. 5A and 5B, the inlet and exhaust transports 500 include an air inlet filter housing 502 and a gas turbine exhaust stack 504. Although not shown in FIGS. 5A and 5B, one or more gas turbine inlet filters and ventilation fans may be located within or housed in the air inlet filter housing 302.

FIGS. 5A and 5B illustrate that the air inlet filter housing 502 may be mounted on the inlet and exhaust transport 500 at a fixed location. Other embodiments of the inlet and exhaust transport 500 may mount the air inlet filter housing 502 with a configuration such that the air inlet filter housing 502 may slide in one or more directions when transitioning between operational mode and transportation mode. For example, as shown in FIG. 5C, the air inlet filter housing 502 may slide out for operational mode and slide back for transport mode. Sliding the air inlet filter housing 502 may be used to align the air inlet filter housing 502 with the inlet plenum of the gas turbine enclosure mounted on the gas turbine generator transport. In another embodiment, the air inlet filter housing 502 may be mounted on a turntable with the ability to engage the inlet plenum of the gas turbine enclosure mounted on the gas turbine generator transport. The air inlet filter housing 502 may comprise a plurality of silencers that reduce noise. The different embodiments for mounting the air inlet filter housing 502 may depend on the amount of clean air and the air flow dynamics needed to supply the gas turbine for combustion.

The gas turbine exhaust stack 504 may comprise the gas turbine exhaust 508, an exhaust extension 506 configured for noise control, and an exhaust end connector 510. The exhaust extension 506 may comprise a plurality of silencers that reduce noise from the inlet and exhaust transport 500.

As shown in FIG. 5A, the gas turbine exhaust stack 504 may be mounted to initially lie on its side during transportation mode. In operational mode, the gas turbine exhaust stack 504 may be rotated up without using external mechanical means such that the gas turbine exhaust stack 504 is mounted to the inlet and exhaust transport 500 on its base and in the upright position. In operational mode, the gas turbine exhaust stack 504 may be positioned using hydraulics, pneumatics, and/or electric motors such that it aligns and connects with the exhaust end connector 510 and exhaust collector of the gas turbine enclosure shown in FIGS. 4A and 4B.

The exhaust end connector 510 may be adjusted to accommodate and align the gas turbine exhaust stack 504 with the exhaust collector of the gas turbine enclosure. In operational mode, the exhaust end connector 510 may move forward in a side direction, which is in the direction toward the gas turbine enclosure. The exhaust end connector 510 may move backward in the side direction, which is in the direction away from the gas turbine enclosure, when transitioning to the transportation mode. Other embodiments of the gas turbine exhaust stack 504 may have the gas turbine exhaust 508 and the exhaust end connector 510 connected as a single component such that the exhaust end connector 510 and the gas turbine exhaust stack 504 are rotated together when transitioning between the transportation and operational modes.

In another embodiment, during transport, the gas turbine exhaust stack 504 may be sectioned into a first section and a second section. For example, the first section may correspond to the gas turbine exhaust 508 and the second section may correspond to the exhaust extension 506. The first section of the gas turbine exhaust stack 508 may be in the upright position and the second section of the gas turbine exhaust stack 506 may be mounted adjacent to the first section of the gas turbine exhaust for transport. The first section and the second section may be hinged together such that the second section may be rotated up to stack on top of the first section for operation. In another embodiment, the gas turbine exhaust stack 504 may be configured such that the entire gas turbine exhaust stack 504 may be lowered or raised while mounted on the inlet and exhaust transport 500.

Typically, the air inlet filter housing 502 and gas turbine exhaust stack 504 may be transported on separate transports and subsequently crane lifted onto the top of gas turbine enclosure and mounted on the gas turbine generator transport during operation mode. The separate transports to carry the air inlet filter housing 502 and gas turbine exhaust stack 504 may not be used during operational mode. However, by adapting the air inlet filter housing 502 and gas turbine exhaust stack 504 to be mounted on a single transport and to connect to at least one of the sides of the gas turbine enclosure mounted on the gas turbine generator transport, the inlet and exhaust transport may be positioned alongside the gas turbine generator transport and subsequently connect the air inlet and exhaust plenums for operations. The result is having a relatively quick rig-up and/or rig-down that eliminates the use of heavy lift cranes, forklifts, and/or any other external mechanical means at the operational site.

FIG. 6 is a schematic diagram of an embodiment of the two transport mobile electric power source 600 when in operational mode. FIG. 6 illustrates a top-down-view of the coupling between the inlet and exhaust transport 500 and the gas turbine transport 400 during operational mode. The exhaust expansion connection 602 may move and connect (e.g., using hydraulics) to the exhaust end connector 510 without using external mechanical means in order to connect the gas turbine exhaust stack of the inlet and exhaust transport with the exhaust collector of the gas turbine generator transport. The inlet expansion connections 604 may move and connect the air inlet filter housing of the inlet and exhaust transport and the inlet plenum of the gas turbine generator transport. The two transports 400 and 500 may be parked at a predetermined orientation and distance such that the exhaust expansion connection 602 and inlet expansion connections 604 are able to connect the two transports 400 and 500.

In one embodiment, to adjust the positioning, alignment, and distance in order to connect the two transports 400 and 500, each of the transports 400 and 500 may include a hydraulic walking system. For example, the hydraulic walking system may move and align transport 500 into a position without attaching the two transports 400 and 500 to transportation vehicles (e.g., a tractor or other type of motor vehicle). Using FIGS. 4 and 5 as an example, the hydraulic walking system may comprise a plurality of outriggers and/or support feet 412 used to move transport 400 and/or transport 500 back and forth and/or sideways. At each outrigger and/or support feet 412, the hydraulic walking system may comprise a first hydraulic cylinder that lifts the transport and a second hydraulic cylinder that moves the transport in the designated orientation or direction. A hydraulic walking system on the transport increases mobility by reducing the precision needed when parking the two transports next to each other.

Figure 11:
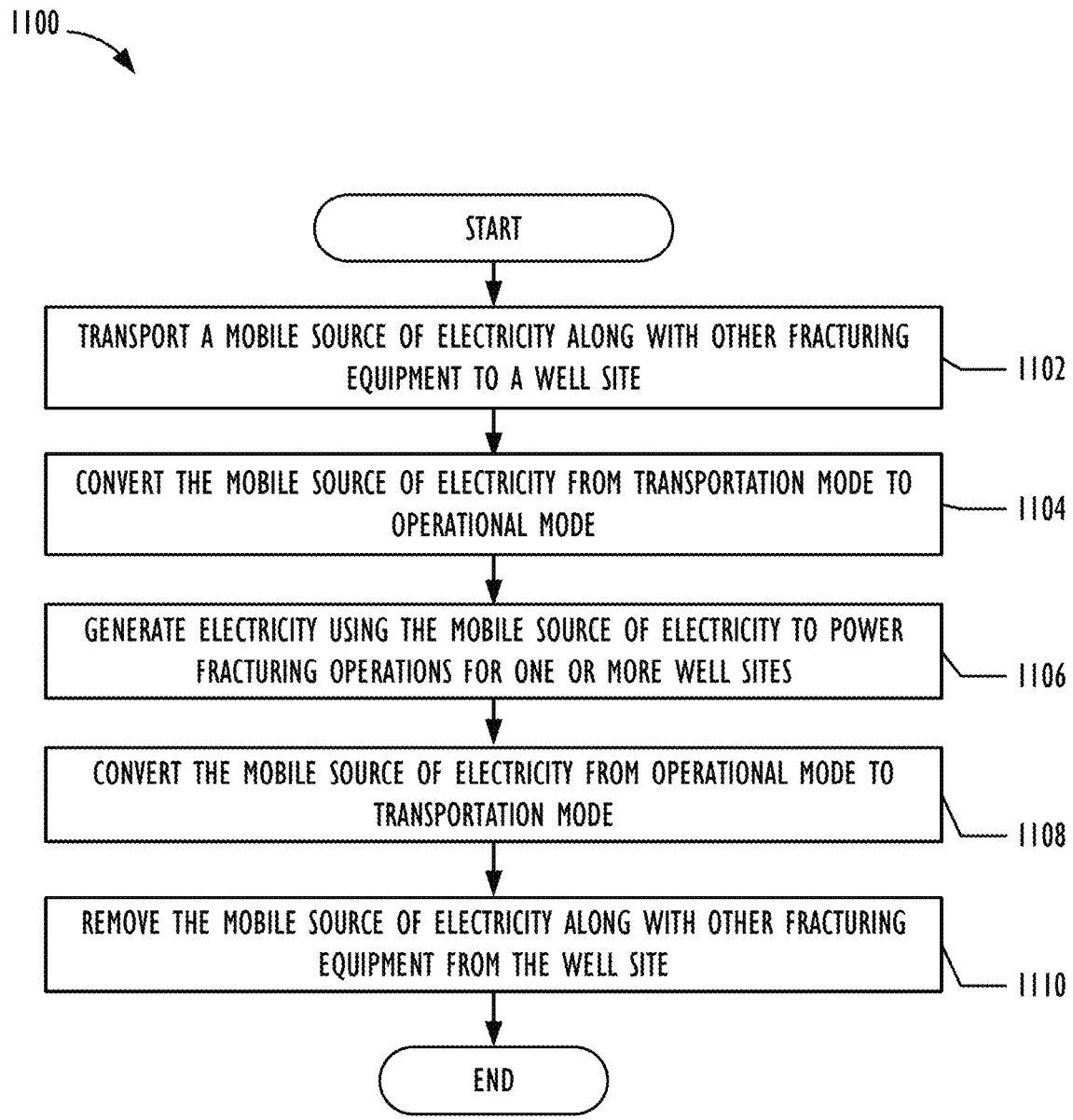
FIG. 11 is a flow chart of an embodiment of a method to provide a mobile source of electricity for fracturing operations.

FIG. 11 is a flow chart of an embodiment of a method 1100 to provide a mobile source of electricity for fracturing operations. Method 1100 may start at block 1102 by transporting a mobile source of electricity with other fracturing equipment to a well site that comprises a non-producing well. Method 1100 may then move to block 1104 and convert the mobile source of electricity from transportation mode to operational mode. The same transports may be used during the conversation from transportation mode to operational mode. In other words, transports are not added and/or removed when setting up the mobile source of electricity for operational mode. Additionally, method 1100 be performed without the use of a forklift, crane, and/or other external mechanical means to transition the mobile source of electricity into operational mode. The conversion process for a two transport trailer is described in more detail in FIGS. 4A-6.

Method 1100 may then move to block 1106 and generate electricity using the mobile source of electricity to power fracturing operations at one or more well sites. In one embodiment, method 1100 may generate electricity by converting hydrocarbon fuel into electricity using a gas turbine generator. Method 1100 may then move to block 1108 and convert the mobile source of electricity from operational mode to transportation mode. Similar to block 1104, the conversion process for block 1108 may use the same transports without using a forklift, crane, and/or other external mechanical means to transition the mobile source of electricity back to transportation mode. Method 1100 may then move to block 1110 to remove the mobile source of electricity along with other fracturing equipment from the well site once fracturing operations are completed.

Fracturing Pump Transport

Figure 7A:
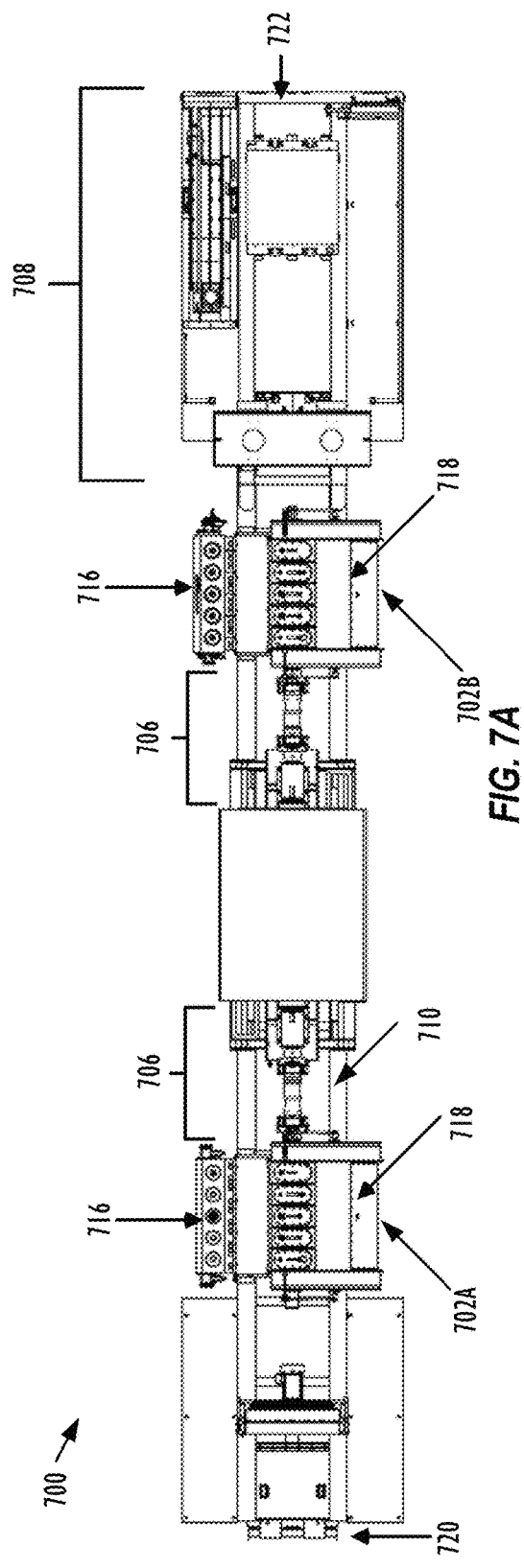
FIG. 7A is a schematic diagram of an embodiment of a fracturing pump transport powered by the mobile source of electricity.
Figure 7B:
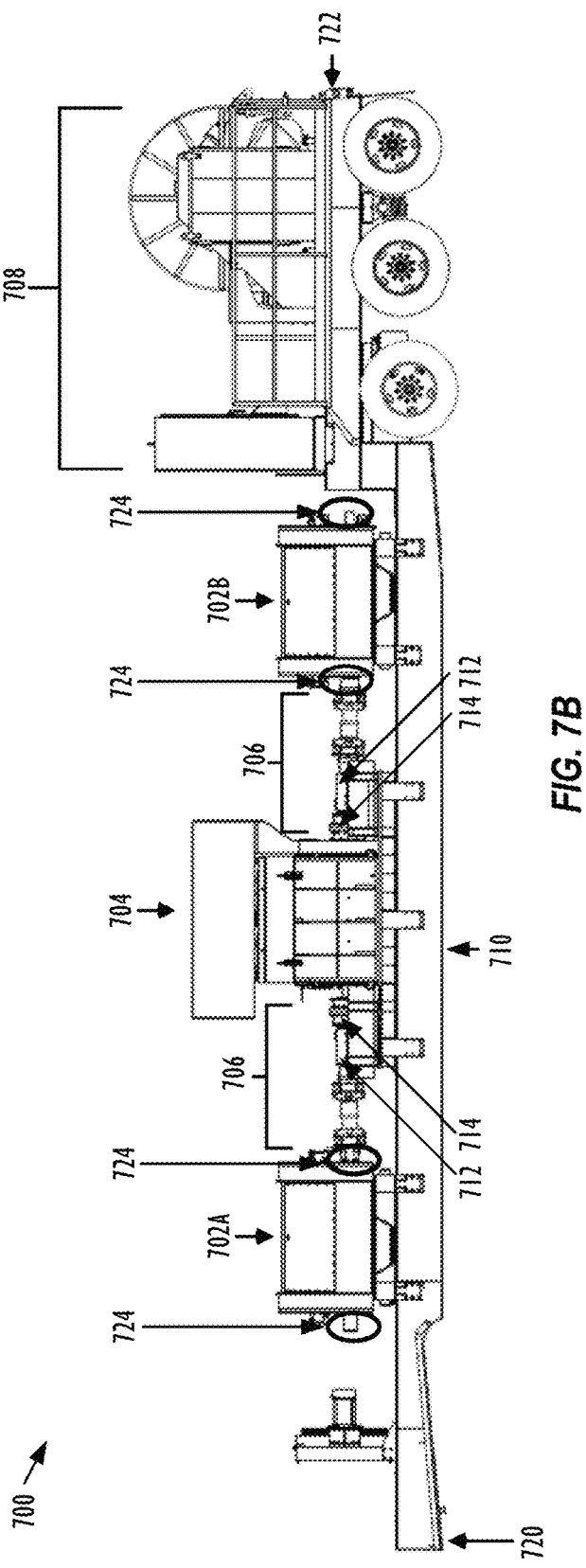
FIG. 7B is a schematic diagram of an embodiment of a fracturing pump transport powered by the mobile source of electricity.

FIGS. 7A and 7B are schematic diagrams of embodiments of a fracturing pump transport 700 powered by the mobile source of electricity as described in FIGS. 4A-6. The fracturing pump transport 700 may include a prime mover 704 powering two separate pumps 702A and 702B. By combining a single prime mover 704 attached to two separate pumps 702A and 702B on a transport, a fracturing operation may reduce the amount of pump transports, prime movers, variable frequency drives (VFD's), ground iron, suction hoses, and/or manifold transports. Although FIGS. 7A and 7B illustrates that the fracturing pump transport 700 supports a single prime mover 704 power two separate pumps 702A and 702B, other embodiments of the fracturing pump transport 700 may include a plurality of prime movers 704 that each power the pumps 702A and 702B.

A "lay-down" trailer 710 design may provide mobility, improved safety, and enhanced ergonomics for crew members to perform routine maintenance and operations of the pumps as the "lay-down" arrangement positions the pumps lower to the ground as the main trailer beams are resting on the ground for operational mode. As shown in FIGS. 7A and 7B, the "lay-down" trailer 710 has an upper section above the trailer axles that could hold or have mounted the fracturing pump trailer power and control systems 708. The fracturing pump trailer power and control system 708 may comprise one or more electric drives, transformers, controls (e.g., a programmable logic controller (PLC) located on the fracturing pump transport 700), and cables for connection to the drive power trailers and/or a separate electric pumper system. The electric drives may provide control, monitoring, and reliability functionality, such as preventing damage to a grounded or shorted prime mover 704 and/or preventing overheating of components (e.g., semiconductor chips) within the electric drives. The lower section, which may be positioned lower than the trailer axles, may hold or have mounted the prime mover 704 and the pumps 702A and 702B attached on opposite sides of each other.

In one embodiment, the prime mover 704 may be a dual shaft electric motor that has a shaft that protrudes on opposite sides of the electric motor. The dual shaft electric motor may be any desired type of alternating current (AC) or direct current (DC) motor. In one embodiment, the dual shaft electric motor may be an induction motor and in another embodiment the dual shaft electric motor may be a permanent magnet motor. Other embodiments of the prime mover 704 may include other electric motors that are configured to provide about 5,000 HP or more. For example, the dual shaft electric motor may deliver motor power in a range from about 1,500 HP to about 10,000 HP. Specific to some embodiments, the dual shaft electric motor may be about a 5,000 HP rated electric motor or about a 10,000 HP electric motor. The prime mover 704 may be driven by at least one variable frequency drive that is rated to a maximum of about 5,000 HP and may receive electric power generated from the mobile source of electric power.

As shown in FIGS. 7A and 7B, one side of the prime mover 704 drives one pump 702A and the opposite side of the prime mover 704 drives a second pump 702B. The pumps 702A and 702B are not configured in a series configuration in relation to the prime mover 704. In other words, the prime mover 704 independently drives each pump 702A and 702B such that if one pump fails, it can be disconnected and the other pump can continue to operate. The prime mover 704, which could be a dual shaft electric motor, eliminates the use of diesel engines and transmissions. Moreover, using a dual shaft electric motor on a transport may prevent dissonance or feedback when transferring power to the pumps. In one embodiment, the prime mover 704 may be configured to deliver at least about 5,000 HP distributed between the two pumps 702A and 702B. For instance, prime mover 704, which may be a dual shaft electric motor, may provide about 2,500 HP to one of the pumps 702A and about 2,500 HP to the other pump 702B in order to deliver a total of about HP. Other embodiments may have the prime mover 704 deliver less than 5,000 HP or more than 5,000 HP. For example, the prime mover 704 may deliver a total of about 3,000 HP by delivering about 1,500 HP to one of the pumps and about 1,500 HP to the other pump. Another example may have the prime mover 704 deliver a total of about 10,000 HP by delivering about 5,000 HP to one of the pumps 702A and about 5,000 HP to another pump 702B. Specifically, in one or more embodiments, the prime mover 704 may operate at HP ratings of about 3,000 HP, 3,500 HP, 4,000 HP, 4,500 HP, 5,000 HP, 5,200 HP, 5,400 HP, 6,000 HP, 7,000 HP, 8,000 HP, 9,000 HP, and/or 10,000 HP.

The fracturing pump transport 700 may reduce the footprint of fracturing equipment on a well-site by placing two pumps 702A and 702B on a single transport. Larger pumps may be coupled to a dual shaft electric motor that operates with larger horse power to produce additional equipment footprint reductions. In one embodiment, each of the pumps 702A and 702B may be quintiplex pumps located on a single transport. Other embodiments may include other types of plunger style pumps, such as triplex pumps. The pumps 702A and 702B may each operate from a range of about 1,500 HP to about 5,000 HP. Specifically, in one or more embodiments, each of the pumps 702A and 702B may operate at HP ratings of about 1,500 HP, 1,750 HP, 2,000 HP, 2,250 HP, 2,500 HP, 2,600 HP, 2,700 HP, 3,000 HP, 3,500 HP, 4,000 HP, 4,500 HP, and/or 5,000 HP. The pumps 702A and 702B may not be configured in a series configuration where the prime mover 704 drives a first pump 702A and the first pump 702B subsequently drives a second pump 702B.

The prime mover 704 and each of the pumps 702A and 702B may be mounted on sub-assemblies configured to be isolated and allow for individual removal from the fracturing pump transport. In other words, the prime mover 704 and each of the pumps 702A and 702B can be removed from service and replaced without shutting down or compromising other portions of the fracturing system. The prime mover 704 and pumps 702A and 702B may be connected to each other via couplings that are disconnected when removed from the fracturing pump transport 700. If the prime mover 704 needs to be replaced or removed for repair, the prime mover sub-assembly may be detached from the fracturing pump transport 700 without removing the two pumps 702A and 702B from the fracturing pump transport. For example, pump 702A can be isolated from the fracturing pump transport 700, removed and replaced by a new pump 702A. If the prime mover 704 and/or the pumps 702A and 702B requires service, an operator can isolate the different components from the fluid lines, and unplug, un-pin, and remove the prime mover 704 and/or the pumps 702A and 702B from the fracturing pump transport. Furthermore, each pump 702A and 702B sub-assembly may be detached and removed from the fracturing pump transport 700 without removal of the other pump and/or the prime mover 704. As such, the fracturing pump transport 700 may not need to be disconnected from the manifold system and driven out of the location. Instead, replacement prime mover 704 and/or the pumps 702A and 702B may be placed backed into the line and reconnected to the fracturing pump transport 700.

To implement the independent removal of the sub-assemblies, the two pumps 702A and 702B may be coupled to the prime mover 704 using a drive line assembly 706 that is adapted to provide remote operation to engage or dis-engage one or both pumps 702A and 702B from the prime mover 704. The drive line assembly 706 may comprise one or more couplings and a drive shaft. For example, the drive line assembly 706 may comprise a fixed coupling that connects to one of the pumps 702A or 702B and a keyed shaft 712. The keyed shaft 712 may interconnect the fixed coupling to a splined toothed coupling 714 that is attached to the prime mover 704. To engage or dis-engage one or both pumps 702A and 702B from the prime mover 704, the spline toothed coupling 714 may include a splined sliding sleeve coupling and a motor coupling that provides motor shaft alignment and provides for a hydraulic fluid powered for connection and disconnection of the sliding sleeve motor and pump coupling. Other embodiments of the couplings may include torque tubes, air clutches, electro-magnetic clutches, hydraulic clutches, and/or other clutches and disconnects that have manual and/or remote operated disconnect devices.

Figure 12:
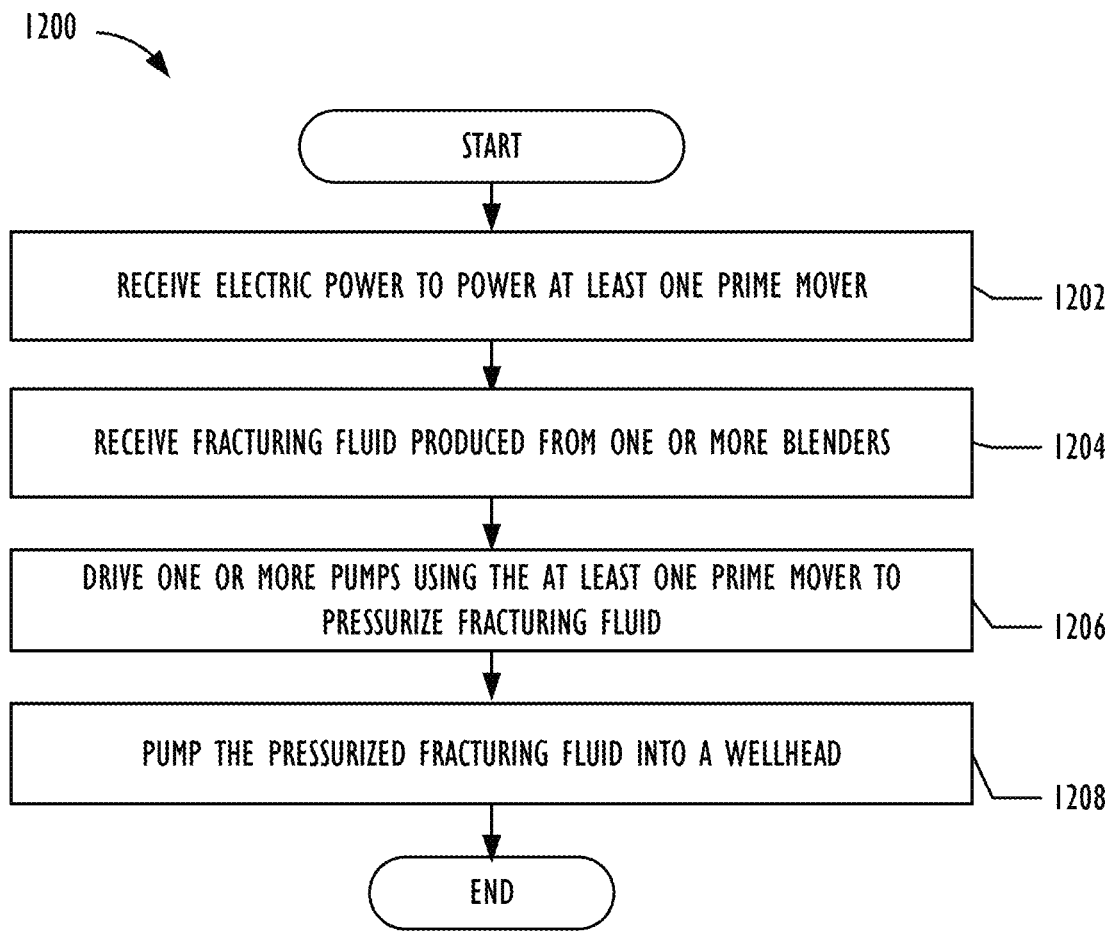
FIG. 12 is a flow chart of an embodiment of a method to pump fracturing fluid into a wellhead.

FIG. 12 is a flow chart of an embodiment of a method 1200 to pump fracturing fluid into a wellhead. Method 1200 starts at block 1202 and receives electric power to power at least one prime mover. The prime mover may be a dual-shaft electric motor located on a fracturing pump transport as shown in FIGS. 7A and 7B. Method 1200 may then move to block 1204 and receive fracturing fluid produced from one or more blenders. In one embodiment, the blenders may be electric blenders that includes enclosed mixer hoppers.

Method 1200 then moves to block 1206 and drives one or more pumps using the at least one prime mover to pressurize the fracturing fluid. In one embodiment the pumps may be positioned on opposite sides and may be drive by single shaft from the dual-shaft electric motor drives both pumps. In other words, when two pumps are operating, method 1200 may drive the two pumps in a parallel configuration instead of a serial configuration. If one of the pumps are removed, method 1200 may continue to drive the remaining pump. Method 1200 may then move to block 1208 and pump the pressurized fracturing fluid into a wellhead.

Blender Transport

FIGS. 8A and 8B are schematic diagrams of an embodiment of a blender transport 800 that includes an electric blender 806. FIG. 8A illustrates a top-down view of the blender transport 800 and FIG. 8B illustrates a side-profile view of the blender transport 800. The blender transport 800 may be powered by the mobile source of electricity as described in FIGS. 1-6. The electric blender 806 may be a dual configuration blender, as described in U.S. Patent Application Publication 2012/0255734, with a blending capacity of about 240 bpm. The dual configuration blender may comprise electric motors for all rotating machinery and may be mounted on a single transport. The dual configuration blender may have two separate blending units that are configured to be independent and redundant. For example, any one or both the blending units may receive a source fluid via inlet manifolds of the blending units. The source fluid may originate from the same source or different sources. The source fluid may subsequently be blended by any one or both of the blending tub and subsequently discharged out of any one or both outlet manifolds of the blending units. Other embodiments of the blender transport 800 may be single configuration blender that includes a single blending unit.

FIGS. 8A and 8B illustrate a "lay-down" trailer 802 design that provides mobility and improves ergonomics for the crew members that perform routine maintenance and operations of the electric blender 806 as the "lay-down" positions the blender tubs, pumps and piping lower to the ground level and the main trailer beams are resting on the ground for operational mode.

Similar to the "lay-down" trailer 710, the "lay-down" trailer 802 may comprise an upper section above the trailer axles and a lower section below the trailer axles. In one embodiment, the electric blender 806 and associated equipment on the trailer may be controlled and monitored remotely via a control system network. As shown in FIGS. 8A and 8B, a blender control system 804 that comprises a PLC, transformers and one or more variable frequency drives are mounted on upper section of the blender transport 800. To provide remote control and monitoring functions, the network may interface and communicate with the PLC (e.g., provide operating instructions), and the PLC may subsequently control one or more variable frequency drives mounted on the blender trailer to drive one or more electric motors of the blender. Operating the blender transport 800 remotely may eliminate equipment operators from being exposed to hazardous environment and avoiding potential exposure concentrated chemicals, silica dust, and rotating machinery. For example, a conventional blender transport typically includes a station for an operator to manually operate the blender. By remotely controlling using the control network and blender control system 804, the station may be removed from the blender transport 800. Recall that a data van may act as a hub to provide the remote control and monitoring functions and instructions to the blender control system 804.

FIGS. 9A and 9B are schematic diagrams of an embodiment of a blender transport 900 that includes an electric blender 902 with enclosed mixer hoppers 904. FIG. 9A illustrates a top-down view of the blender transport 900 and FIG. 9B illustrates a side-profile view of the blender transport 900. The electric blender 902 is substantially similar to the electric blender 806 except that the electric blender 902 uses enclosed mixer hoppers 904 to add proppants and additives to the blending tub. FIGS. 9A and 9B illustrate that the electric blender 902 is a dual configuration blender that includes two enclosed mixer hoppers 904 powered by two electric motors, where each of the electric motors may operate an enclosed mixer hopper 904.

Blenders that comprises open hoppers and augers typically have the proppants (e.g., sand) and/or additives exposed to the weather elements. In situations where precipitation occurs at the well site, operators may cover the open hoppers and augers with drapes, tarps, and/or other coverings to prevent the precipitation from contaminating the proppants and/or additives. The enclosed mixer hopper 904 replaces the open hopper and augers typically included in a blender (e.g., electric blender 806 in FIGS. 8A and 8B) with enclosed mixer hoppers 904 (FIGS. 9A and 9B). By replacing the open hopper and augers with enclosed mixer hoppers 904 the blender transport 900 may have the advantages of dust free volumetric proppant measurement, dust free mixing of proppant and additives, moderate the transport of proppants, perform accurate volumetric measurements, increase proppant transport efficiency with low slip, prevent proppant packing from vibration, produce a consistent volume independent of angle of repose, and meter and blend wet sand. Other advantages include the removal of gearboxes and increasing safety for operators with the enclosed drum.

Control Network System

Figure 10:
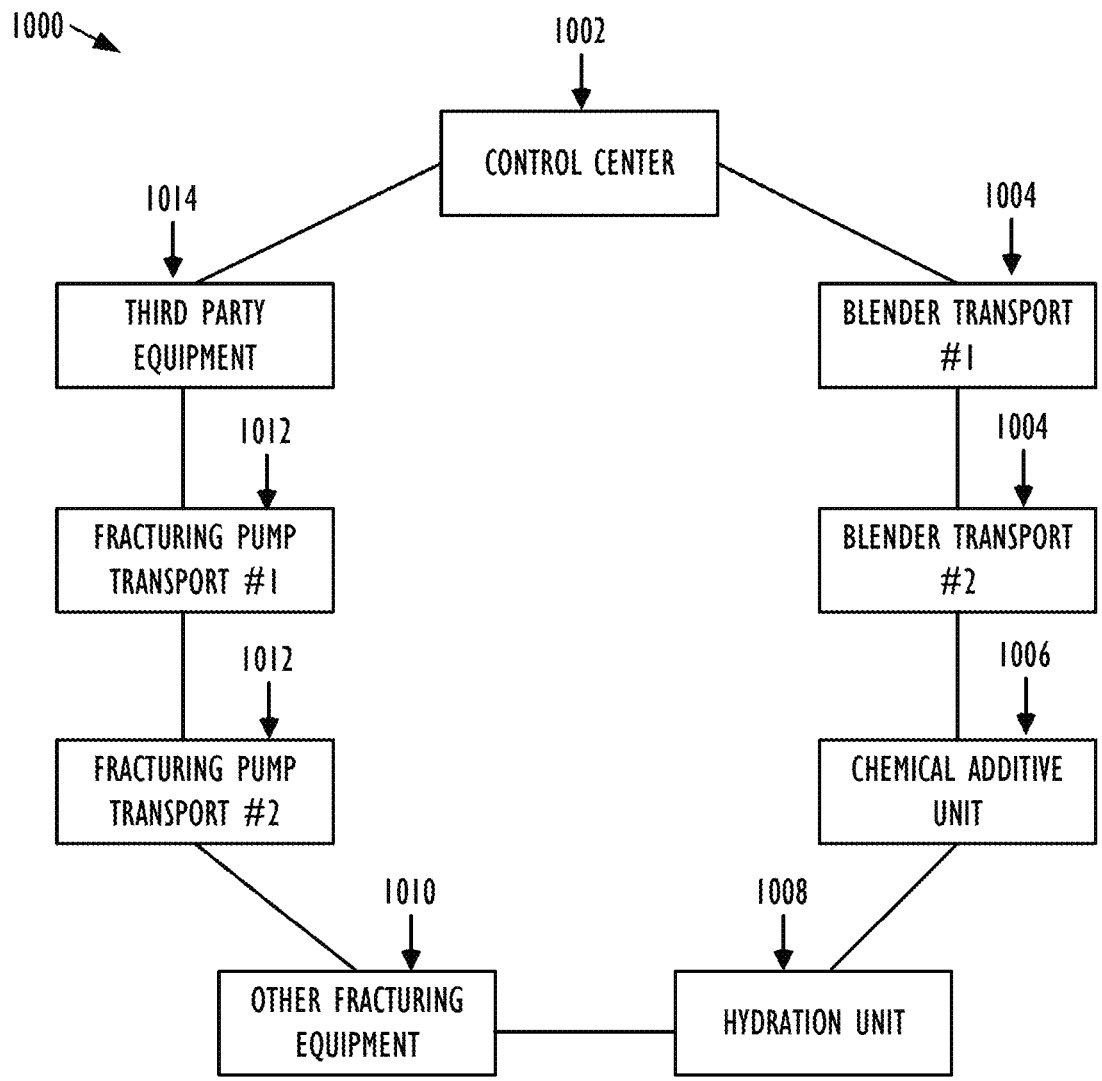
FIG. 10 is a schematic diagram of an embodiment of a control network system used to monitor, control, and communicate with a variety of control systems located at one or more well sites.

FIG. 10 is a schematic diagram of an embodiment of a control network system 1000 used to monitor, control, and communicate with a variety of control systems located at one or more well sites. FIG. 10 illustrates that the control network system 1000 may be in a ring-topology that interconnects the control center 1002, blender transports 1004, chemical additive unit 1006, hydration unit 1008, and fracturing pump transports 1012. A ring topology network may reduce the amount of control cabling used for fracturing operations and increase the capacity and speed of data transfers and communication. Additionally, the ring topology may allow for two way communication and control by the control center 1002 for equipment connected to the control network system 1000. For example, the control center may be able to monitor and control the other fracturing equipment 1010 and third party equipment 1014 when added to the control network system 1000, and for multiple pieces of equipment to communicate with each other. In other network topologies, such as a star or mesh topology, the other fracturing equipment 1010 and third party equipment 1014 may be limited to one way communication where data is transmitted from the fracturing equipment 1010 and/or third party equipment 1014 to the control center 1002, but not vice versa or between different pieces of equipment.

In one embodiment, the control network system 1000 may be a network, such as an Ethernet network that connects and communications with the individual control systems for each of the fracturing equipment. The control center 1002 may be configured to monitor, control, and provide operating instructions to the different fracturing equipment. For example, the control center 1002 may communicate with the VFDs located within the drive power transports 104 that operate and monitor the health of the electric motors used to drive the pumps on the fracturing pump transports 108. In one embodiment, the control center 1002 may be one or more data vans. More data vans may be used when the fracturing operations include fracturing more than two wellheads simultaneously.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

What is claimed is:

1. A system for providing mobile electric power, the system comprising:
    a first transport including an inlet plenum, a gas turbine, an exhaust collector, and a generator, wherein the inlet plenum is in communication with an air intake of the gas turbine and the exhaust collector is in communication with an air exhaust of the gas turbine; and
    a second transport including an exhaust stack,
    wherein the first transport and the second transport are separate transports that are independently movable in a transportation mode,
    wherein, in an operational mode, a first longitudinal facing side of the first transport is positioned parallel along a second longitudinal facing side of the second transport, and
    wherein, in the operational mode, the exhaust collector is connectable to the exhaust stack between the first longitudinal facing side and the second longitudinal facing side.

2. The system of claim 1, wherein the exhaust stack has an exhaust passage, the exhaust stack being configured to be movable between a first position and a second position, the exhaust stack in the first position being lowered on the second transport, and the exhaust stack in the second position being raised and pointing the exhaust passage vertically on the second transport.

3. The system of claim 2, wherein the second transport further includes a hinge and hydraulics permitting rotation of the exhaust stack between the first position and the second position, the exhaust stack in the first position being horizontal on the second transport.

4. The system of claim 2, wherein, in the transportation mode in the first position, a longitudinal side of the exhaust passage is parallel to the second longitudinal facing side of the second transport.

5. The system of claim 2, wherein the exhaust stack includes an exhaust end connector, and wherein, in the operational mode in the second position, at least a part of the exhaust stack is positioned above the exhaust end connector.

6. The system of claim 5, further comprising an expansion connection that is configured to interconnect the exhaust collector with the exhaust end connector between the first longitudinal facing side and the second longitudinal facing side.

7. The system of claim 5, wherein the exhaust collector is disposed on the first longitudinal facing side of the first transport, and
    wherein, in the operational mode, the exhaust end connector communicates with the exhaust collector on the first longitudinal facing side of the first transport.

8. The system of claim 5, wherein the exhaust stack, when positioned in the second position, is configured to place the exhaust passage in fluid communication with the exhaust collector via the exhaust end connector.

9. The system of claim 1, further comprising:
an air inlet filter housing,
   wherein the inlet plenum is disposed on the first longitudinal facing side of the first transport, and
   wherein, in the operational mode, the air inlet filter housing is connectable with the inlet plenum to provide filtered combustion air.

10. The system of claim 9,
wherein the first transport further comprises a turbine enclosure for housing the gas turbine, an inlet of the turbine enclosure being disposed on the first longitudinal facing side, and
wherein, in the operational mode, the air inlet filter housing is further connectable with the inlet of the turbine enclosure to provide filtered air for ventilating and cooling the gas turbine.

11. The system of claim 1, wherein each of the first transport and the second transport includes a hydraulic walking system for positioning the first longitudinal facing side of the first transport at a predetermined distance and orientation relative to the second longitudinal facing side of the second transport.

12. The system of claim 1, further comprising:
an auxiliary transport that is separately and independently movable relative to the first transport and the second transport, wherein the auxiliary transport is an auxiliary gas turbine generator transport that is configured to generate electric power to at least one of start the gas turbine disposed on the first transport, and provide ancillary power where peak electric power demand exceeds an electric power output of the generator disposed on the first transport.

13. The system of claim 12, wherein the electric power generated by the auxiliary gas turbine generator transport is in a range of 1-8 megawatts.

14. The system of claim 1, wherein electric power generated by the generator disposed on the first transport is in a range of 15-35 megawatts.

15. The system of claim 1, wherein the second transport further comprises an expansion joint configured to:
   connect to the first transport in the operational mode without being supported by a mechanical apparatus external to the second transport; and
   disconnect from the first transport to allow the first transport and the second transport to move independently relative to each other in the transportation mode.

16. The system of claim 1, wherein the first transport further comprises a generator breaker and a control system that, during operation, communicates with a control center via a network.

* * * * *